(12) United States Patent
Gorobets et al.

(10) Patent No.: US 8,296,498 B2
(45) Date of Patent: Oct. 23, 2012

(54) METHOD AND SYSTEM FOR VIRTUAL FAST ACCESS NON-VOLATILE RAM

(75) Inventors: Sergey Anatolievich Gorobets, Edinburgh (GB); Niv Cohen, Kibutz Shamir (IL); Russell R. Reynolds, Los Gatos, CA (US)

(73) Assignee: SanDisk Technologies Inc., Plano, TX (US)

( * ) Notice: Subject to any disclaimer, the term of this patent is extended or adjusted under 35 U.S.C. 154(b) by 937 days.

(21) Appl. No.: 11/939,318

(22) Filed: Nov. 13, 2007

(65) Prior Publication Data
US 2010/0023672 A1 Jan. 28, 2010

(51) Int. Cl.
*G06F 12/08* (2006.01)
(52) U.S. Cl. .................... 711/103; 711/155; 711/209
(58) Field of Classification Search .................. None
See application file for complete search history.

(56) References Cited

U.S. PATENT DOCUMENTS

| | | |
|---|---|---|
| 5,043,940 A | 8/1991 | Harari |
| 5,070,032 A | 12/1991 | Yuan et al. |
| 5,095,344 A | 3/1992 | Harari |
| 5,172,338 A | 12/1992 | Mehrotra et al. |
| 5,268,870 A | 12/1993 | Harari |
| 5,313,421 A | 5/1994 | Guterman et al. |
| 5,315,541 A | 5/1994 | Harari et al. |
| 5,343,063 A | 8/1994 | Yuan et al. |
| 5,532,962 A | 7/1996 | Auclair et al. |
| 5,570,315 A | 10/1996 | Tanaka et al. |
| 5,661,053 A | 8/1997 | Yuan |
| 5,774,397 A | 6/1998 | Endoh et al. |
| 5,798,968 A | 8/1998 | Lee et al. |
| 5,890,192 A | 3/1999 | Lee et al. |
| 5,909,449 A | 6/1999 | So et al. |
| 5,930,167 A | 7/1999 | Lee et al. |
| 6,046,935 A | 4/2000 | Takeuchi et al. |
| 6,222,762 B1 | 4/2001 | Guterman et al. |
| 6,230,233 B1 | 5/2001 | Lofgren et al. |
| 6,345,001 B1 | 2/2002 | Mokhlesi et al. |
| 6,426,893 B1 | 7/2002 | Conley et al. |
| 6,456,528 B1 | 9/2002 | Chen |
| 6,467,038 B1 * | 10/2002 | Piwonka et al. .................. 713/1 |
| 6,522,580 B2 | 2/2003 | Chen et al. |
| 6,763,424 B2 | 7/2004 | Conley |
| 6,836,432 B1 * | 12/2004 | Parker et al. ............ 365/185.03 |
| 6,925,007 B2 | 8/2005 | Harari et al. |
| 6,973,531 B1 | 12/2005 | Chang et al. |
| 6,983,428 B2 | 1/2006 | Cernea |
| 6,985,992 B1 | 1/2006 | Chang et al. |
| 7,035,967 B2 | 4/2006 | Chang et al. |

(Continued)

*Primary Examiner* — Gary J Portka
(74) *Attorney, Agent, or Firm* — Brinks Hofer Gilson & Lione

(57) ABSTRACT

A method of writing data to a non-volatile memory with minimum units of erase of a block, a page being a unit of programming of a block, may read a page of stored data addressable in a first increment of address from the memory into a page buffer, the page of stored data comprising an allocated data space addressable in a second increment of address, pointed to by an address pointer, and comprising obsolete data. The first increment of address is greater than the second increment of address. A portion of stored data in the page buffer may be updated with the data to form an updated page of data. Storage space for the updated page of data may be allocated. The updated page of data may be written to the allocated storage space. The address pointer may be updated with a location of the allocated storage space.

22 Claims, 23 Drawing Sheets

U.S. PATENT DOCUMENTS

| | | |
|---|---|---|
| 7,096,313 B1 | 8/2006 | Chang et al. |
| 7,120,729 B2 | 10/2006 | Gonzalez et al. |
| 7,139,864 B2 | 11/2006 | Bennett et al. |
| 7,173,852 B2 | 2/2007 | Gorobets et al. |
| 7,212,440 B2 | 5/2007 | Gorobets |
| 7,600,090 B2 * | 10/2009 | Cohen et al. ............... 711/167 |
| 2006/0106972 A1 | 5/2006 | Gorobets et al. |
| 2006/0155922 A1 | 7/2006 | Gorobets et al. |
| 2006/0161722 A1 | 7/2006 | Bennett et al. |
| 2007/0033323 A1 | 2/2007 | Gorobets |
| 2007/0101095 A1 | 5/2007 | Gorobets |
| 2007/0101096 A1 | 5/2007 | Gorobets |
| 2007/0113029 A1 | 5/2007 | Bennett et al. |
| 2007/0113030 A1 | 5/2007 | Bennett et al. |
| 2007/0143561 A1 | 6/2007 | Gorobets |
| 2007/0143567 A1 | 6/2007 | Gorobets |

* cited by examiner

| | SECTOR 0 | SECTOR 1 | SECTOR 2 | SECTOR 3 | |
|---|---|---|---|---|---|
| | X 802 | | | | PAGE 0 |
| | X+1 804 | X+1 806 | X+1 808 | | PAGE 1 |
| | X+2 810 | X+2 812 | X+2 814 | | PAGE 2 |
| | X+3 816 | | | | PAGE 3 |

↖ 800

| | SECTOR 0 | SECTOR 1 | SECTOR 2 | SECTOR 3 | |
|---|---|---|---|---|---|
| | X 852 | X+1 854 | X+1 856 | X+1 858 | PAGE 0 |
| | X+2 860 | X+2 862 | X+2 864 | X+3 866 | PAGE 1 |
| | | | | | PAGE 2 |
| | | | | | PAGE 3 |

METHOD AND SYSTEM FOR VIRTUAL FAST ACCESS NON-VOLATILE RAM

TECHNICAL FIELD

This application relates generally to the operation of non-volatile flash memory systems, and, more specifically, to a method and system for virtual fast access non-volatile RAM.

BACKGROUND

There are many commercially successful non-volatile memory products being used today, particularly in the form of small form factor cards, which employ flash EEPROM (Electrically Erasable and Programmable Read Only Memory) cells formed on one or more integrated circuit devices. A memory controller, usually, but not necessarily, on a separate integrated circuit device interfaces with a host to which the card is removably connected and controls operation of the non-volatile memory within the card. Such a controller typically includes a microprocessor, some non-volatile read-only-memory (ROM), a volatile random-access-memory (RAM) and one or more special circuits such as one that calculates an error-correction-code (ECC) from data that passes through the controller during the programming and reading operations. Some of the commercially available card formats include CompactFlash (CF) cards, MultiMedia cards (MMC), Secure Digital (SD) cards, personnel tags (P-Tag), and Memory Stick cards. Hosts include personal computers, notebook computers, personal digital assistants (PDAs), various data communication devices, digital cameras, cellular telephones, portable audio players, automobile sound systems, and similar types of equipment. In some systems, a removable card does not include a controller and the host controls operation of the memory in the card. Examples of this type of memory system include Smart Media cards and xD cards. Thus, control of the memory may be achieved by software on a controller in the card or by control software in the host. Besides a memory card implementation, this type of memory can alternatively be embedded into various types of host systems. In both removable and embedded applications, host data may be stored in the memory according to a storage scheme implemented by memory control software.

Two general memory cell architectures have found commercial application, NOR and NAND. In a typical NOR architecture, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells. Examples of such cells, their uses in memory systems, and methods of manufacturing them are given in U.S. Pat. Nos. 5,070,032, 5,095,344, 5,313,421, 5,315,541, 5,343,063, 5,661,053 and 6,222,762. These patents, along with all other patents and patent applications referenced in this application are hereby incorporated by reference in their entirety.

A typical NAND architecture utilizes strings of more than two series-connected memory cells, such as 16 or 32, connected along with one or more select transistors between individual bit lines and a reference potential to form columns of cells. Word lines extend across cells within many of these columns. An individual cell within a column is read and verified during programming by causing the remaining cells in the string to be turned on so that the current flowing through a string is dependent upon the level of charge stored in the addressed cell. Examples of NAND architectures and their operation as part of a memory system are found in U.S. Pat. No. 6,522,580.

For purposes of this application, the block is the erase unit, a minimum number of cells that are simultaneously erasable. Each block typically contains one or more pages of data, the page being the minimum unit of programming and reading. Each page typically stores one or more sectors of data, the size of the sector being defined by the host system.

The charge storage elements of flash EEPROM cells, as discussed in the foregoing referenced patents, are most commonly electrically conductive floating gates, typically formed from conductively doped polysilicon material. An alternate type of memory cell useful in flash EEPROM systems utilizes a non-conductive dielectric material in place of the conductive floating gate to store charge in a non-volatile manner. A triple layer dielectric formed of silicon oxide, silicon nitride and silicon oxide (ONO) is sandwiched between a conductive control gate and a surface of a semi-conductive substrate above the memory cell channel. The cell is programmed by injecting electrons from the cell channel into the nitride, where they are trapped and stored in a limited region, and erased by injecting hot holes into the nitride. Examples of specific cell structures and architectures employing dielectric storage elements and are described in U.S. Pat. No. 6,925,007.

As in many integrated circuit applications, the pressure to shrink the silicon substrate area needed to implement some integrated circuit function also is present in flash EEPROM memory cell architectures. It may be desirable to increase the amount of digital data that can be stored in a given area of a silicon substrate, in order to increase the storage capacity of a given size memory card or other types of packages for a non-volatile memory, or to both increase capacity and decrease size. One way to increase the storage density of data is to store more than one bit of data per memory cell and/or per storage unit or element. This is accomplished by dividing storage element's charge level voltage range into more than two windows, in order to create more than two states. The use of four such states, for example, allows each cell to store two bits of data. Similarly, eight states may store three bits of data per storage element. Multiple state flash EEPROM structures using floating gates and their operation are described in U.S. Pat. Nos. 5,043,940 and 5,172,338, and structures using such dielectric floating gates are described in U.S. Pat. No. 6,925,007. Selected portions of a multi-state memory cell design may also be operated in two states (binary) for various reasons, in a manner described in U.S. Pat. Nos. 5,930,167 and 6,456,528.

Individual flash EEPROM cells may store an amount of charge in a charge storage element or unit that is representative of one or more bits of data. The charge level of a storage element controls the threshold voltage (commonly referenced as $V_T$) of its memory cell, which is used as a basis of reading the storage state of the cell. A threshold voltage window may be divided into a number of ranges, one for each of the two or more storage states of the memory cell. These ranges may be separated by guardbands that include a nominal sensing level that allows determining the storage states of the individual cells. These storage levels may shift as a result of disturbances in the stored charge caused by programming, reading, or erasing operations performed in neighboring or other related memory cells, pages, or blocks. Error correction codes (ECCs) are therefore typically calculated by the controller and stored along with the host data being programmed and used during reading to verify the data and perform some level of data correction if necessary. Also, shifting charge levels can be restored back to the centers of their state ranges from time-to-time, before disturbing operations cause them to shift completely out of their defined ranges and thus cause erroneous data to be read. This process, termed data refresh or read scrub, is described in U.S. Pat. Nos. 5,532,962 and 5,909,449. A read scrub operation may entail reading data in areas of a memory that may have received exposure to potentially disturbing signals, determining if the read data has been disturbed, and performing some corrective action on the disturbed read data. Disturbed data may be detected by verifying ECCs associated with the data to be tested. Disturbed data may be corrected by rewriting the data in the same location, or in a different location. Read scrubbing may be performed in a scheduled, continuous manner, throughout the memory, as described in U.S. Pat. No. 7,153,852.

The responsiveness of flash memory cells typically changes over time as a function of the number of times the cells are erased and re-programmed. This may be the result of the accumulation of small amounts of trapped in a storage element dielectric layer during each erase and/or re-programming operation. This generally results in the memory cells becoming less reliable, and may need higher voltages for erasing and programming as the memory cells age. The effective threshold voltage window over which the memory states may be programmed can also decrease as a result of this charge retention. This is described, for example, in U.S. Pat. No. 5,268,870. The result is a limited effective lifetime of the memory cells; that is, memory cell blocks may be subjected to only a preset number of erasing and re-programming cycles before they are mapped out of the system. The number of cycles to which a flash memory block is desirably subjected may depend upon the particular structure of the memory cells, the amount of the threshold window that is used for the storage states, the extent of the threshold window usually increasing as the number of storage states of each cell is increased. Depending upon these and other factors, the number of lifetime cycles can be as low as 10,000 and as high as 100,000 or even several hundred thousand.

Continual erasing and re-programming of data sectors in a relatively few logical block addresses may occur where the host continually updates certain sectors of housekeeping data stored in the memory, such as file allocation tables (FATs) and the like. Specific applications can also cause a few logical blocks to be re-written much more frequently than others with user data. For example, in response to receiving a command from the host to write data to a specified logical block address, the data are written to one of a few blocks of a pool of erased blocks. That is, instead of re-writing the data in the same physical block where the original data of the same logical block address resides, the logical block address is remapped into a block of the erased block pool. The block containing the original and now invalid data is then erased either immediately or as part of a later garbage collection operation, and then placed into the erased block pool. The result, when data in only a few logical block addresses are being updated much more than other blocks, is that a relatively few physical blocks of the system are cycled with the higher rate.

System control and directory data, such as file allocation tables (FATs) are produced, accessed, and updated in order to complete some memory read and write operations. Conventionally, this type of data is set up in the controller RAM, thereby allowing direct access by the controller. After the memory device is powered up, a process of initialization enables the flash memory to be scanned in order to compile the necessary system control and directory information to be placed in the controller RAM. If the size of the controller RAM is insufficient to store all of the system control and directory data, a portion of system control and directory data may be stored in the non-volatile memory.

In some memories, a page may consist of a portion of a block that can hold multiple sectors of data. Once the page has been written, no further writing may be possible without corrupting the data that is already written. For memories using such a system, a page may be defined by a set of memory cells that are connected to the same word line. Such memories may be inefficiently programmed where data is received in amounts that are less than the size of a page. For example, where data is received one sector at a time, just one sector may be programmed to a page. No additional data may be programmed to the page without risk of corrupting the sector of data that is already saved there. In another example, when small amounts of data are received with delay between portions of data, each portion may be written to a separate page of the memory, where a portion may need less than a page of storage.

SUMMARY OF THE INVENTION

In order to address these issues, there is a need for a more efficient way to store data in a memory that has a multi-sector page when the memory receives data in amounts that are less than a page, or less than a sector. There is also a need for faster read and write access to small amounts of data stored in memory. Finally, there is a need for a way to store small amounts of data in a memory without subjecting a limited number of memory blocks to a much larger number of erase and re-programming cycles.

Thus, according to one aspect of the invention, a method is provided for writing data to a non-volatile memory having memory cells arranged in minimum units of erase of a block, a page being a unit of programming of a block. A page of stored data, addressable in a first increment of address from the non-volatile memory, is read into a page buffer. The page of stored data comprises an allocated data space addressable in a second increment of address and pointed to by an address pointer. The allocated data space comprises obsolete data. The first increment of address is greater than the second increment of address. A portion of stored data in the page buffer is updated with the data to form an updated page of data. Storage space addressable in the first increment of address in the non-volatile memory, and sufficient to store the updated page of data, is allocated. The updated page of data is written to the allocated storage space. The address pointer is updated with a location of said allocated storage space.

In another aspect of the invention, there is a method for copying valid sectors in valid pages within a non-volatile memory from a first block to a second block. A second block is allocated when a number of erased pages in the first block equals a threshold. All valid sectors in all valid pages are copied from the first block to the second block. The first block is erased.

According to another aspect of the invention, there is a method for providing a write interface for storing data in a non-volatile memory having memory cells arranged in minimum units of erase of a block, and a page being a unit of programming of a block. Address and data to be written are received, wherein the address identifies a plurality of stored bytes less than a sector. A programmed page associated with said address is located, wherein the programmed page is addressable in a first increment of address greater than or equal to a sector. The programmed page is copied into a page buffer. A portion of data in said page buffer is updated with the data to be written. An unprogrammed page addressable in said first increment of address is allocated. The unprogrammed page is programmed using the page buffer to form a programmed page. The received address is associated with the programmed page.

In yet another aspect of the invention, there is a method for copying valid sectors in valid pages within a non-volatile memory from a first block to a second block. A second block is allocated when a number of erased pages in the first block equals a threshold. All valid sectors in all valid pages are copied from the first block to the second block. The first block is erased.

According to one aspect of the invention, a memory card comprises a non-volatile memory comprising memory cells, a byte-addressable interface configured for writing a plurality of the memory cells within a first address space, a byte-addressable interface configured for reading a plurality of the memory cells within the first address space, an interface configured for writing at least one sector of the memory cells to a sector-aligned address within a second address space, wherein a sector comprises more than one byte of data, wherein the first address space and second address space do not overlap, and an interface configured for reading a plurality of the memory cells within the second address space.

Other methods, apparatus, systems, features, and advantages of the invention will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

FIG. 8 shows an exemplary garbage collection operation, in accordance with an embodiment.

DETAILED DESCRIPTION OF THE PREFERRED EMBODIMENTS

Figure 1A:
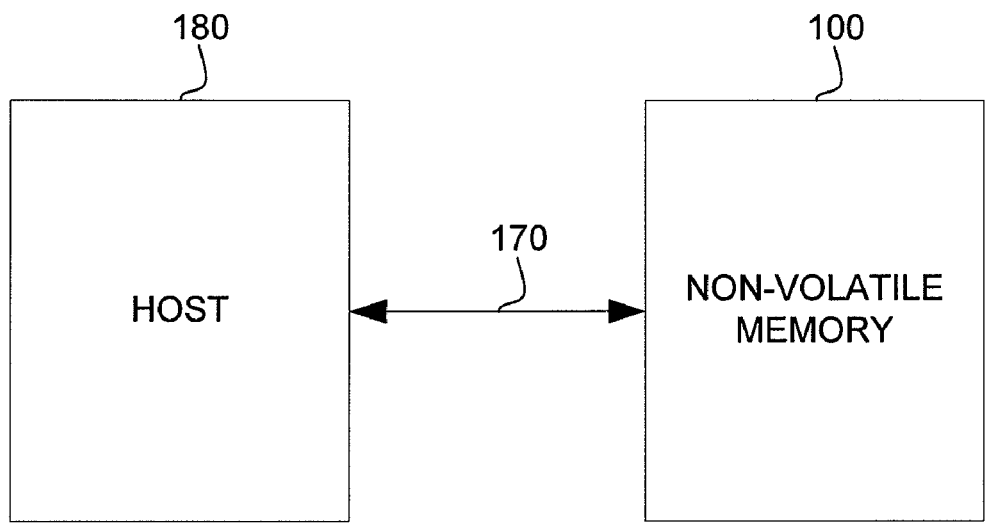
FIG. 1A is a diagram illustrating a system for storing data in a non-volatile memory, in accordance with an embodiment.

Memory cells of a typical flash EEPROM may be divided into discrete physical blocks of cells that are erased together (a block). That is, the block is the erase unit, a minimum number of cells that are simultaneously erasable. Each block typically contains one or more pages of data, the page being the minimum unit of programming and reading, although more than one page may be programmed or read in parallel in different planes or portions of the memory. A page typically stores one or more sectors of data, the size of the sector being defined by the host system. An example sector includes 512 bytes of user data, following a standard established with magnetic disk drives, plus a plurality of bytes of overhead information about the user data and/or the block in which the sector is stored. In another example, a page stores a plurality of bytes of overhead data, and one or more sectors of data, where a sector includes 512 bytes of user data. A sector may also be defined to comprise other amounts of user data. Such memories are typically configured with 16, 32, or more pages within each block, and each page stores one or more sectors of data.

In order to increase the degree of parallelism during programming user data into the memory and read user data from it, the memory is typically divided into sub-memories, commonly referred to as planes, which contain their own data registers and other circuits to allow parallel operation such that sectors of data may be programmed to or read from each of several or all the planes simultaneously. A memory on a single integrated circuit may be physically divided into planes, or each plane may be formed from one or more integrated circuit devices. Examples of such a memory implementation are described in U.S. Pat. Nos. 5,798,968 and 5,890,192.

To further efficiently manage the memory, blocks may be linked together to form virtual blocks or metablocks. Each metablock may be defined to include one block from each plane in the memory. Organization and use of metablocks are described in U.S. Pat. No. 6,763,424. The metablock is identified by a host logical block address as a destination for programming and reading data. All blocks of a metablock may be erased together. A metablock may be programmed in a unit of a metapage that comprises one page from each block in a metablock. The controller in a memory system operated with such large blocks and/or metablocks performs a number of functions including the translation between logical block addresses (LBAs) received from a host, and physical block numbers (PBNs) within the memory. Individual pages within blocks are typically identified by offsets within the block address. Address translation often involves use of intermediate terms of metablock address, logical page, and/or logical block number (LBN). In a memory system using metablocks, the metablock may be the effective minimum unit of erase of the memory. Thus, the minimum unit of erase (a block) may be either a block or a metablock depending on the memory architecture. The term "block" may refer to either a block or a metablock depending on the architecture. Similarly, the term "page" may refer to the minimum unit of programming of the memory system. This may be a page within a single block or may be a metapage that extends across several blocks depending on the architecture of the memory system.

In some memory systems, the physical memory cells are also grouped into two or more zones. A zone may be any partitioned subset of the physical memory or memory system into which a specified range of logical block addresses is mapped. For example, a memory system capable of storing 64 Megabytes of data may be partitioned into four zones that store 16 Megabytes of data per zone. The range of logical block addresses is then also divided into four groups, one group being assigned to the physical blocks of each of the four zones. Logical block addresses are constrained, in a typical implementation, such that the data of each are never written outside of a single physical zone into which the logical block addresses are mapped. In a memory divided into planes (sub-memories), which each have their own addressing, programming and reading circuits, each zone preferably includes blocks from multiple planes, typically the same number of blocks from each of the planes. Zones are primarily used to simplify address management such as logical to physical translation, resulting in smaller translation tables, less RAM memory needed to hold these tables, and faster access times to address the currently active region of memory.

Data stored in a metablock are often updated, and the likelihood of an update increases as the data capacity of the metablock increases. Updated sectors of one metablock may be written to another metablock. The unchanged sectors of one metablock may also be copied from the original to the new metablock, as part of the same programming operation, to consolidate the data. Alternatively, the unchanged data may remain in the original metablock until later consolidation with the updated data into a single metablock. Operations to consolidate current data to one or more blocks and erasing one or more blocks containing only obsolete data are generally referred to as "garbage collection" operations. The term "compaction" may refer to performing garbage collection on one block. In other words, compaction involves copying current data from one block to a new block, then erasing the block with obsolete data.

It is common to operate large block or metablock systems with some extra blocks maintained in an erased block pool. When one or more pages of data less than the capacity of a block are being updated, it is typical to write the updated pages to an erased block from the pool and then copy data of the unchanged pages from the original block to erase pool block. Variations of this technique are described in aforementioned U.S. Pat. No. 6,763,424. Over time, as a result of host data files being re-written and updated, many blocks can end up with a relatively few number of pages containing valid data and the remaining pages containing data that is no longer current or valid. In order to be able to efficiently use the data storage capacity of the memory, logically related data pages of valid data are from time-to-time gathered together from fragments among multiple blocks and consolidated together into a fewer number of blocks. This process is also commonly termed "garbage collection."

In one example, a garbage collection process may be triggered by a write operation that programs the last remaining unprogrammed page in a block. In this case, a write operation that triggers a garbage collection process may take longer to complete than an operation that does not trigger a garbage collection process. Alternatively, a garbage collection already in progress may delay the completion of a new write operation. When the amount of data being written is relatively small, the worst-case write time may be dominated by the amount of time needed to complete a garbage collection associated with the write operation.

As mentioned above, repeated access to a handful of logical block addresses may result in an uneven number of program and erase cycles on a relatively small number of cells. There are several techniques to even out the wear on physical blocks in a memory caused by unevenly distributed logical block access. For example, in order to keep track of the number of cycles experienced by the memory cells of the individual blocks, a count can be kept for each block, or for each of a group of blocks, that is incremented each time the block is erased, as described in aforementioned U.S. Pat. No. 5,268,870. This count may be stored in each block, as there described, or in a separate block along with other overhead information, as described in U.S. Pat. No. 6,426,893. In addition to its use for mapping a block out of the system when it reaches a maximum lifetime cycle count, the count can be used to control erase and programming parameters as the memory cell blocks age. As an alternative to keeping an exact count of the number of cycles, U.S. Pat. No. 6,345,001 describes a technique of updating a compressed count of the number of cycles when a random or pseudo-random event occurs.

The cycle count can also be used to even out the usage of the memory cell blocks of a system before they reach their end of life. This process is often referred to as "wear leveling." Several different wear leveling techniques are described in U.S. Pat. Nos. 7,120,729, 7,096,313, 7,035,967, 6,985,992, 6,973,531, and 6,230,233. The primary advantage of wear leveling is to prevent some blocks from reaching their maximum cycle count, and thereby having to be mapped out of the system, while other blocks have barely been used. By spreading the number of cycles reasonably evenly over all the blocks of the system, the full capacity of the memory can be maintained for an extended period with good performance characteristics.

Dividing a memory into zones can result in less than optimum wear leveling. In another approach to wear leveling, boundaries between physical zones of blocks are gradually migrated across the memory by incrementing the logical-to-physical block address translations by one or a few blocks at a time. This is described in U.S. Pat. No. 7,120,729.

When a wear leveling algorithm is implemented, housekeeping processes such as managing the memory file system, and specific applications that may cause a few logical blocks to be re-written much more frequently than others with user data, may operate with a reduced risk that physical blocks in the card will reach their maximum cycle count well ahead of other physical blocks. However, some wear leveling algorithms may swap physical block locations corresponding to two relatively large sets of logical block addresses. The algorithm must move stored data between the two physical block locations when the swap is performed. The copying of data may be time consuming, and may adversely impact the performance of other read and write operations.

FIG. 1A is a diagram illustrating a system for storing data in a non-volatile memory, in accordance with an embodiment. The system includes a host 180 in communication with a non-volatile memory 100 over a plurality of connections 170. In one embodiment of the invention, the host 180 may store data in the non-volatile memory 100 by transmitting data over the connections 170. In another embodiment of the invention, the host 180 may read stored from the non-volatile memory 100 by receiving data over the connections 170.

Some examples of a host 180 include desktop computers, laptop computers, handheld computers, palmtop computers, personal digital assistants (PDAs), MP3 and other audio players, digital cameras, video cameras, electronic game machines, wireless and wired telephony devices, answering machines, voice recorders, and network routers.

Figure 1B:
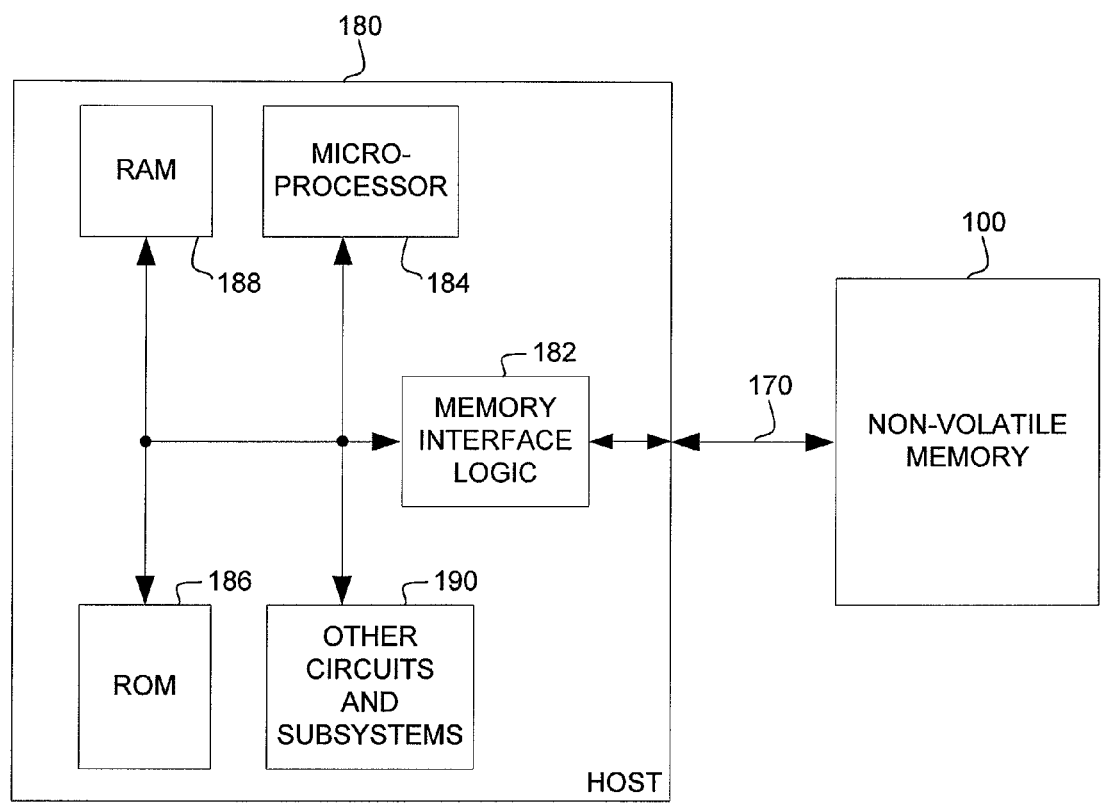
FIG. 1B is a block diagram of an exemplary host system, in accordance with an embodiment.

FIG. 1B is a block diagram of an exemplary host system, in accordance with an embodiment. Data transfers between the host 180 and the non-volatile memory 100 are made through the memory interface logic circuits 182. The host 180 may also include a microprocessor 184, a ROM 186 for storing firmware code, and a RAM 188. Other circuits and subsystems 190 may include a high capacity magnetic data storage disk drive, and user interface circuitry such as a keyboard, a keypad, a monitor, or display, depending upon the particular host system.

Figure 1C:
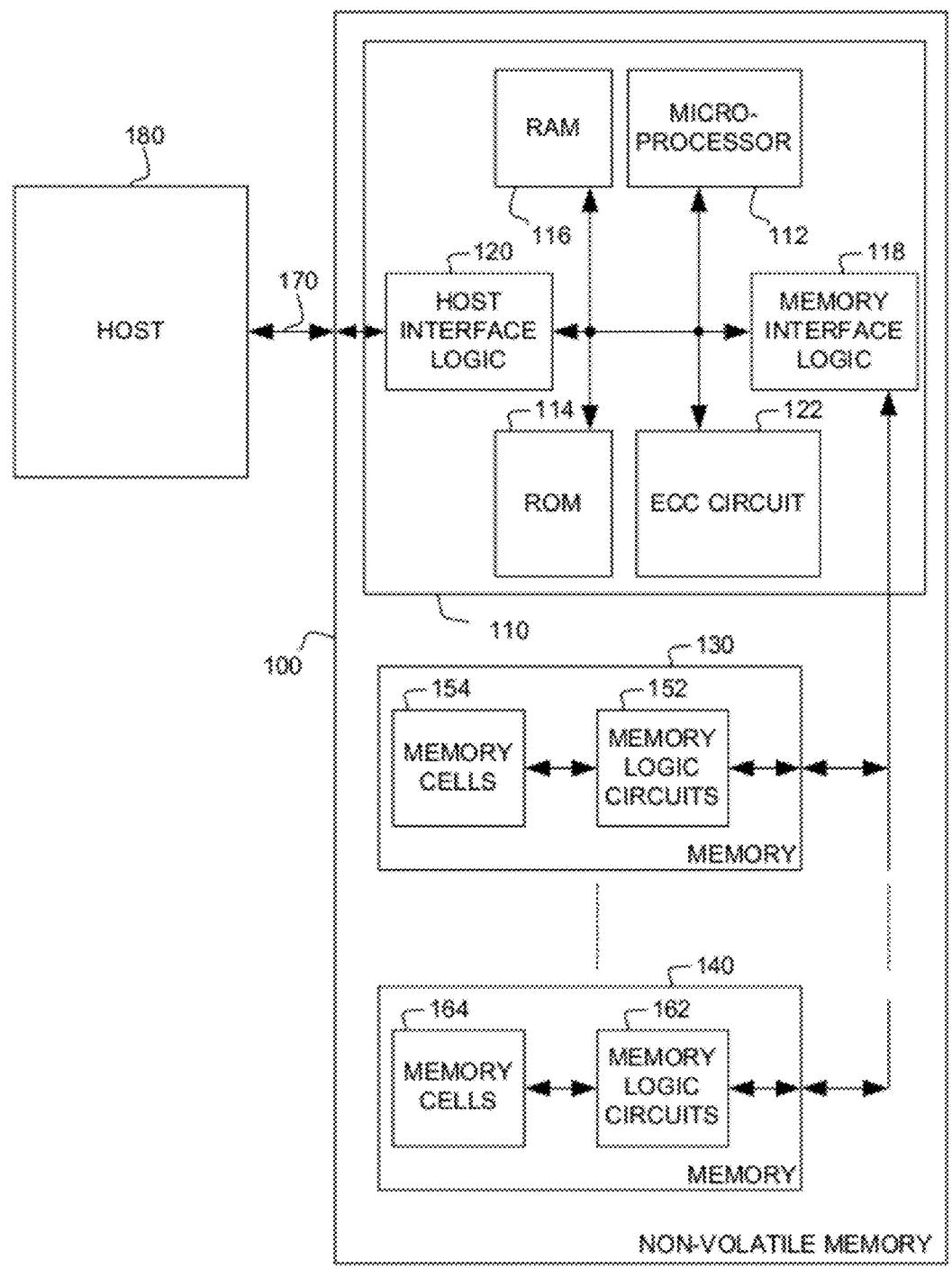
FIG. 1C is a block diagram of an exemplary non-volatile memory system, in accordance with an embodiment.

FIG. 1C is a block diagram of an exemplary non-volatile memory system, in accordance with an embodiment. A non-volatile memory 100 may include plurality of memories 130, 140 and a controller 110. The number of memories 130, 140 may depend upon the storage capacity provided by the non-volatile memory 100. In the example shown, the memory 130 includes memory cells 154 and various logic circuits 152. Similarly, the memory 140 includes memory cells 164 and various logic circuits 162. The logic circuits 152 and 162 interface with the controller 110 through data, command and status circuits 118, and also provide addressing, data transfer and sensing, and other support to memory cells 154 and 164, respectively. The controller 110 and the memories 130, 140 may be combined within or more integrated circuit devices.

The controller 110 may include a microprocessor 112, a read-only-memory (ROM) 114 primarily to store firmware, and a buffer memory (RAM) 116 primarily for the temporary storage of data either being written to or read from the memories 130, 140. Memory interface logic circuits 118 may communicate with the memories 130, 140 and the host interface logic circuits 120 may communicate with a host though connections 170.

A host 180 in communication with the non-volatile memory 100 through the connections 170 may store data to and read data from memories 130, 140. The microprocessor 112 may store data provided by the host 180 as part of a write request by the host 180, and read data and return data to the host 180, in response to a read request from the host 180. In another embodiment, the microprocessor 112 may store its own data to and read its own data from the memories 130, 140. In one example, the microprocessor 112 may store and read values of variables computed by the microprocessor 112 while executing a program, or may store values received from other circuits within the controller 110. In another example, in response to a read request from the host 180, the microprocessor 112 may read and/or write memories 130, 140 to retrieve and/or store encryption keys, decryption keys, or Digital Rights Management (DRM) variables needed to complete the host read request. In this example, the encryption/decryption keys and DRM variables are not returned to the host 180, but rather, are used to compute the read data to return to the host 180, such as by decrypting data stored in the memories 130, 140. These examples demonstrate that the memories 130, 140 may store data on behalf of the microprocessor 112, and may store data on behalf of the host 180. Stated another way, the microprocessor 112 may act as a local host by storing and reading its own data in the memories 130, 140, or may store and read data on behalf of the host 180.

Data integrity may be verified by calculating an Error Correction Code (ECC) with ECC circuit 122. As data is being transferred from the host 180 to the memory 130, 140 for storage, the ECC circuit 122 may calculate an ECC value for the data, and the ECC value may stored in the memories 130, 140. When the same data and its corresponding ECC code are read from the memories 130, 140, the ECC circuit 122 may use the read data to calculate the ECC value by the same algorithm, and may compare that value with the one calculated and stored with the data in memories 130, 140. If the values match, the integrity of the data is confirmed. If values differ, the erroneous stored data bits, up to a number supported by the specific ECC algorithm utilized, may be identified and corrected.

The non-volatile memory 100 may be implemented as a small enclosed card containing the controller and all its memory circuit devices in a form that is removably connectable with the host 180. That is, the connections 170 allow a card to be disconnected and moved to another host, or replaced by connecting another card to the host. In another embodiment, the memories 130, 140 may be enclosed in a separate card that is electrically and mechanically connectable with a card containing the controller 110 and the connections 170. In yet another embodiment, the non-volatile memory 100 may be embedded within the host 180, wherein the plurality of connections 170 may be permanent. In this embodiment, the non-volatile memory 100 may be contained within the same enclosure as the host 180 along with other system components.

Figure 2:
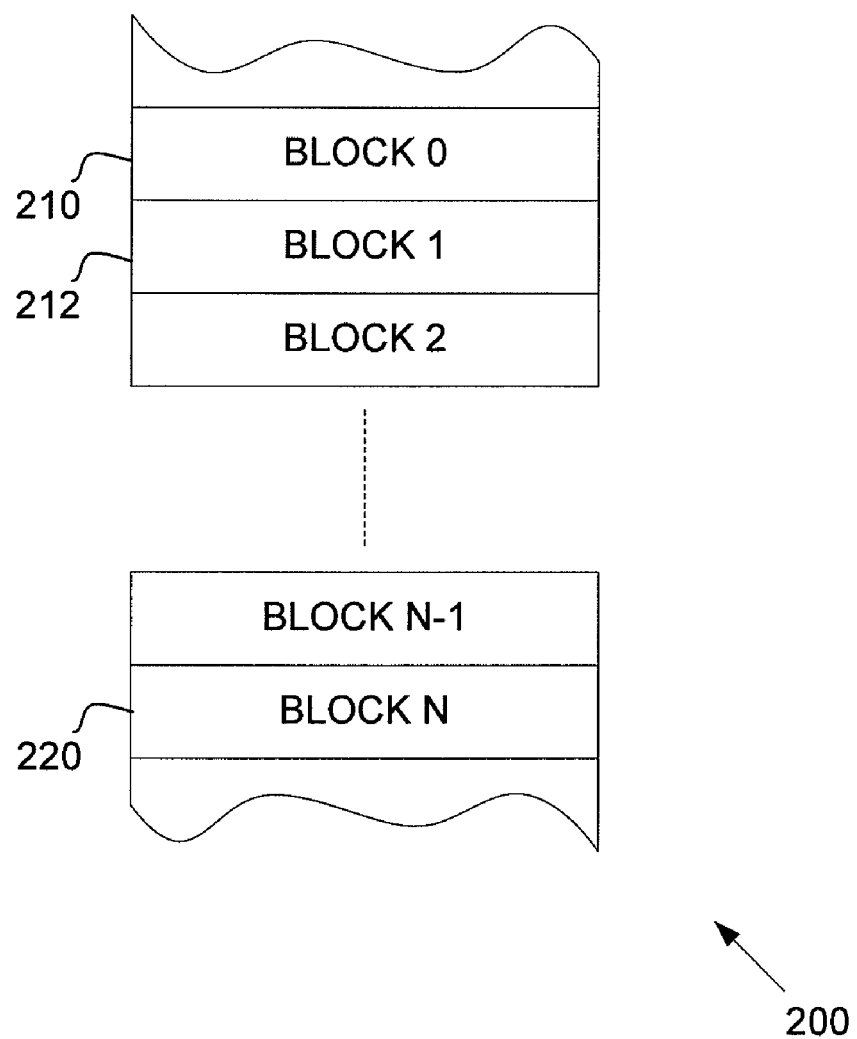
FIG. 2 is an exemplary organization of a portion of a non-volatile memory, in accordance with an embodiment.

FIG. 2 is an exemplary organization of a portion of a non-volatile memory, in accordance with an embodiment. In the portion of the memory 200, memory cells are grouped into blocks 210, 212, 220. All of the memory cells within a block are erased as part of a single erase operation. Therefore, a block is the minimum unit of erase in this type of memory organization. A plurality of blocks 210, 212, 220 may be erased as part of a single erase operation.

Figure 3:
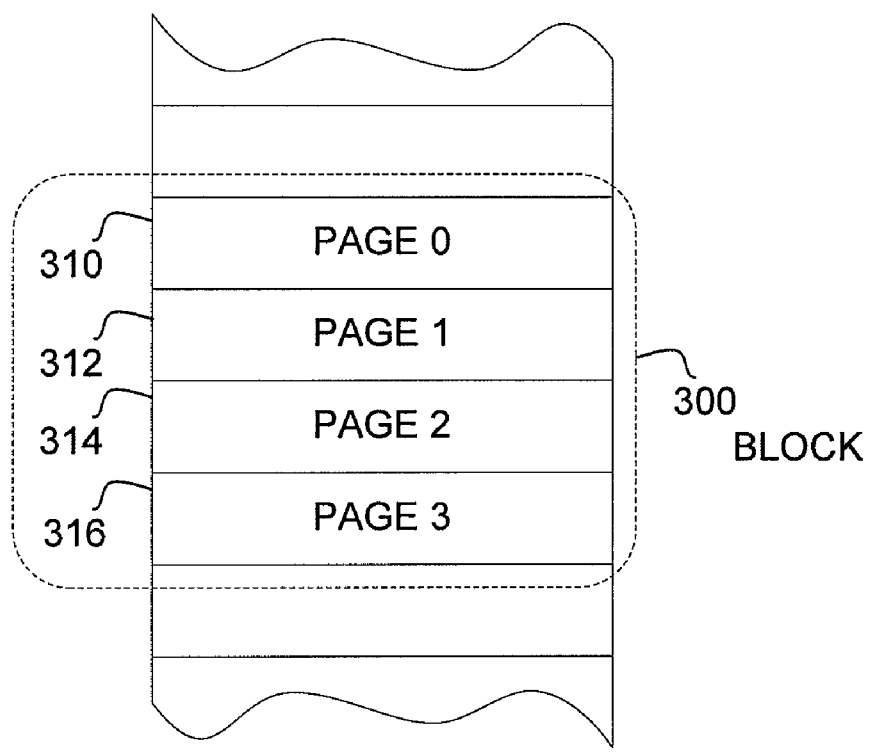
FIG. 3 is an exemplary organization of a block within a non-volatile memory, in accordance with an embodiment.

FIG. 3 is an exemplary organization of a block within a non-volatile memory, in accordance with an embodiment. A block 300, still the minimum unit of erase, contains a plurality of pages 310, 312, 316. A single page is the minimum unit of programming.

Figure 4:
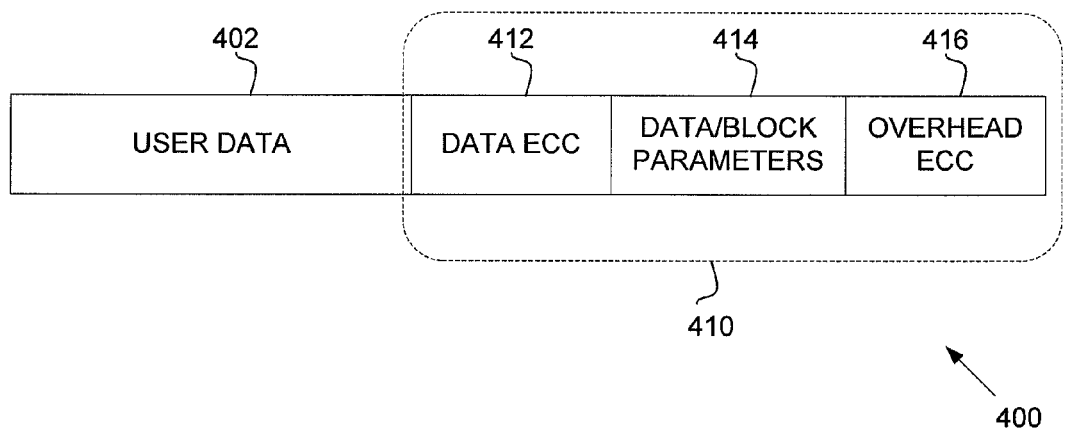
FIG. 4 is an exemplary organization of a page within a block of a non-volatile memory, in accordance with an embodiment.

FIG. 4 is an exemplary organization of a page within a block of a non-volatile memory, in accordance with an embodiment. A page 400 may include user data 402 that comprises a plurality of sectors, where a sector may comprise 512 data bytes, or any other number of data bytes as established by the host system. In one embodiment, user data 402 comprises four sectors, or 2048 data bytes. In addition to the user data 402, page 400 may also comprise overhead data 410 that may comprise a plurality of ECC values 412 calculated from the user data 402, parameters 414 relating to the sector data and/or the block in which the sector is programmed, and an ECC value 416 calculated from the parameters 414. One ECC value 412 may be calculated for each sector of user data 402, so if, for example, user data 402 is four sectors, there may be four ECC values 412 stored. In another embodiment, a single ECC value 412 may be calculated utilizing all of the sectors of user data 402.

The parameters 414 of page 400 may include a plurality of flags that indicate status or states. For example, the parameters 414 may indicate voltage levels to be used for programming and/or erase operations, where the voltage values may be updated as the number of cycles experienced by the page and other factors change. The parameters 414 may include an identification of any defective cells within the page, the logical address of the block that is mapped into this physical block, and the address of any substitute block in case the primary block is defective. The particular combination of the parameters 414 that are used in any memory system will vary in accordance with the design. In another embodiment, some or all of the overhead data 410 can be stored in dedicated blocks, rather than in the page containing the user data to which the overhead data pertains.

Re-writing the data of an entire block usually involves programming the new data into a block of a block pool, the original block then being erased and placed in the erase pool. When data of less than all the pages of a block are updated, the updated data are typically stored in a page of a block from the erased block pool and data in the remaining unchanged pages are copied from the original block into the new block. The original block is then erased. Variations of this large block management technique include writing the updated data into a page of another block without moving data from the original block or erasing it. This results in multiple pages having the same logical address. The most recent page of data is identified by some convenient technique such as the time of programming that is recorded as a field in sector or page overhead data.

Figure 5:
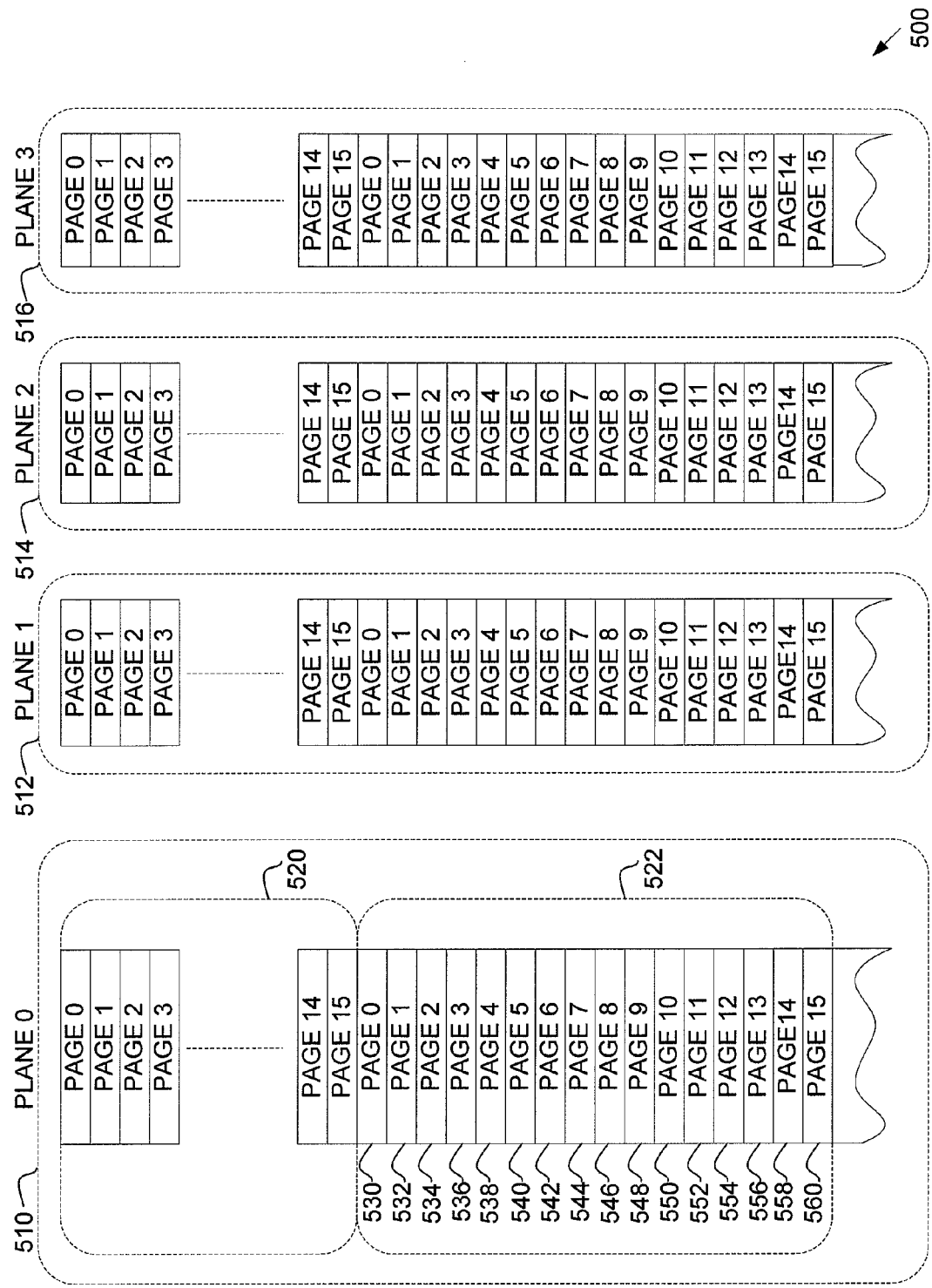
FIG. 5 is exemplary organization of pages and blocks within a non-volatile memory, in accordance with an embodiment.

FIG. 5 is exemplary organization of pages and blocks within a non-volatile memory, in accordance with an embodiment. A memory 500 may be physically divided into two or more planes. In one embodiment, the memory 500 may be divided into four planes 510, 512, 514, 516. Each plane is a portion of the memory that has its own data registers, sense amplifiers, addressing decoders and other support circuitry in order to be able to operate largely independently of the other planes. All the planes 510, 512, 514, 516 may be implemented on one or more integrated circuit devices. In one embodiment, each plane 510, 512, 514, and 516 is constructed on a separate integrated circuit device. Each plane 510, 512, 514, 516, may comprise a plurality of blocks 520, 522, and each block may comprise a plurality of pages 530, 532, 534, 536, 538, 540, 542, 544, 546, 548, 550, 552, 554, 556, 558, 560. In one embodiment, each block 520, 522 may contain 16 pages, P0-P15. Each page 530-560, may contain a plurality of sectors and some overhead data.

Figure 6:
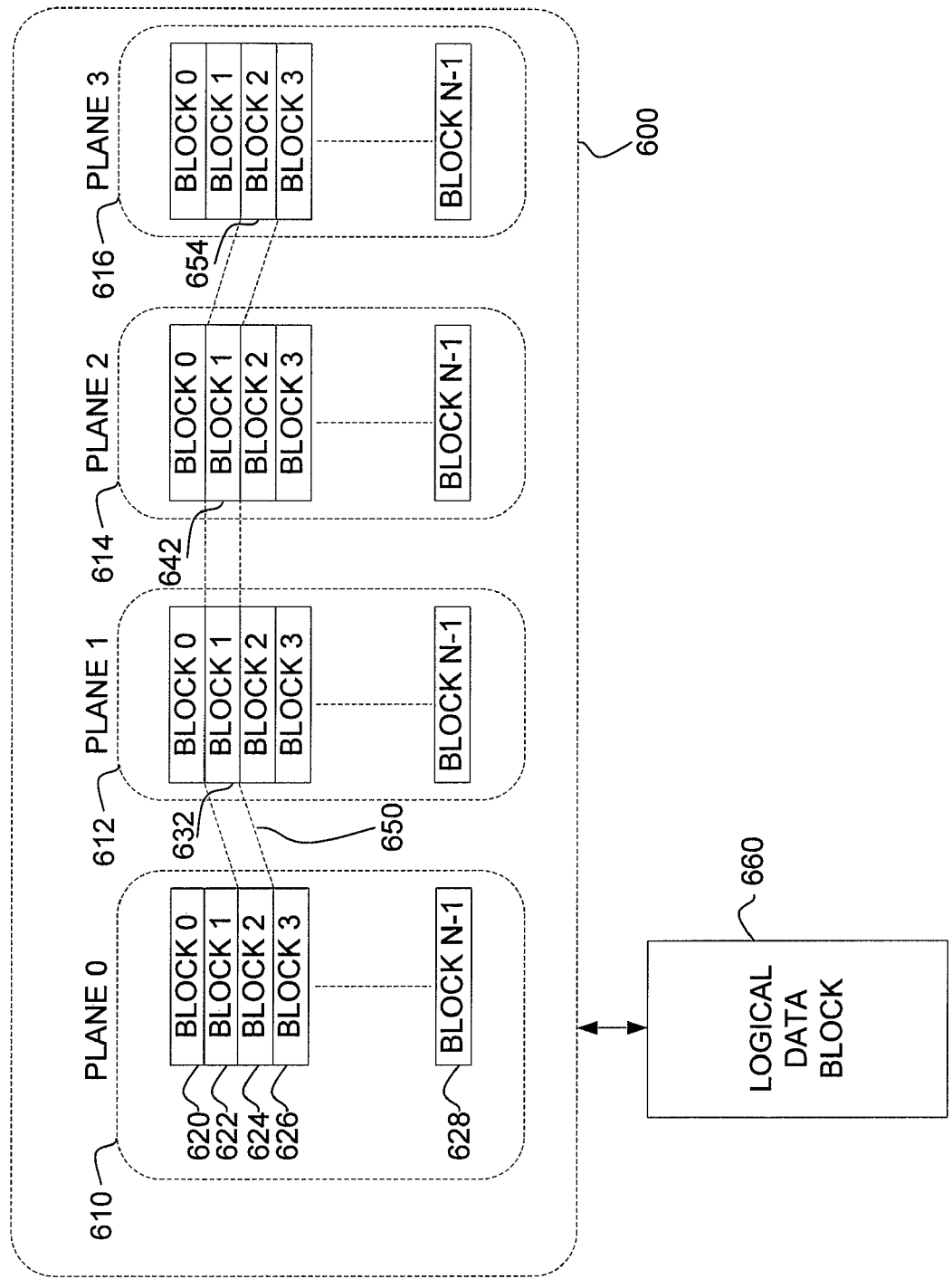
FIG. 6 is another exemplary organization of pages and blocks within a non-volatile memory, in accordance with an embodiment.

FIG. 6 is another exemplary organization of pages and blocks within a non-volatile memory, in accordance with an embodiment. Memory 600 may be physically divided into two or more planes. In one embodiment, a memory is divided into planes 610, 612, 614, and 616. Each plane is divided into a plurality of blocks of memory cells. For example, plane 610 is divided into N blocks 620, 622, 624, 626, 628. Each block 620, 622, 624, 626, 628 is further divided into pages. In order to increase the degree of parallelism of operation, blocks within different planes may be logically linked to form a plurality of metablocks. One exemplary metablock 650 comprises block 3 of plane 0, block 1 from plane 1, block 1 from plane 2, and block 2 from plane 3. Each metablock may be logically addressable and the memory controller may assign and keep track of the blocks 626, 632, 642, 654 that form an individual metablock 650. The host system may interface with the memory system in units of data, referred to as logical data blocks, equal to the capacity of the individual metablocks. Such a logical data block 660, for example, is identified by a logical block addresses (LBA) mapped by the controller into the physical block numbers (PBNs) of the blocks 626, 632, 642, 654 that make up the metablock 650.

All pages of the blocks 626, 632, 642, 654 of the metablock 650 may be erased together. A metablock may be considered the unit of erase in a system in which blocks are linked to form metablocks. Pages from each block are preferably programmed and read simultaneously. In memories having the metablock architecture shown in FIG. 6, a metapage consists of a page from each plane of the metablock. In these memories, a metapage is a minimum unit of programming, so, for example, a page in a block 626 of plane 610 may only be programmed in parallel with a page in each of the blocks 632, 642, 654, of the other planes 612, 614, 616 that comprise the metablock 650.

Figure 7:
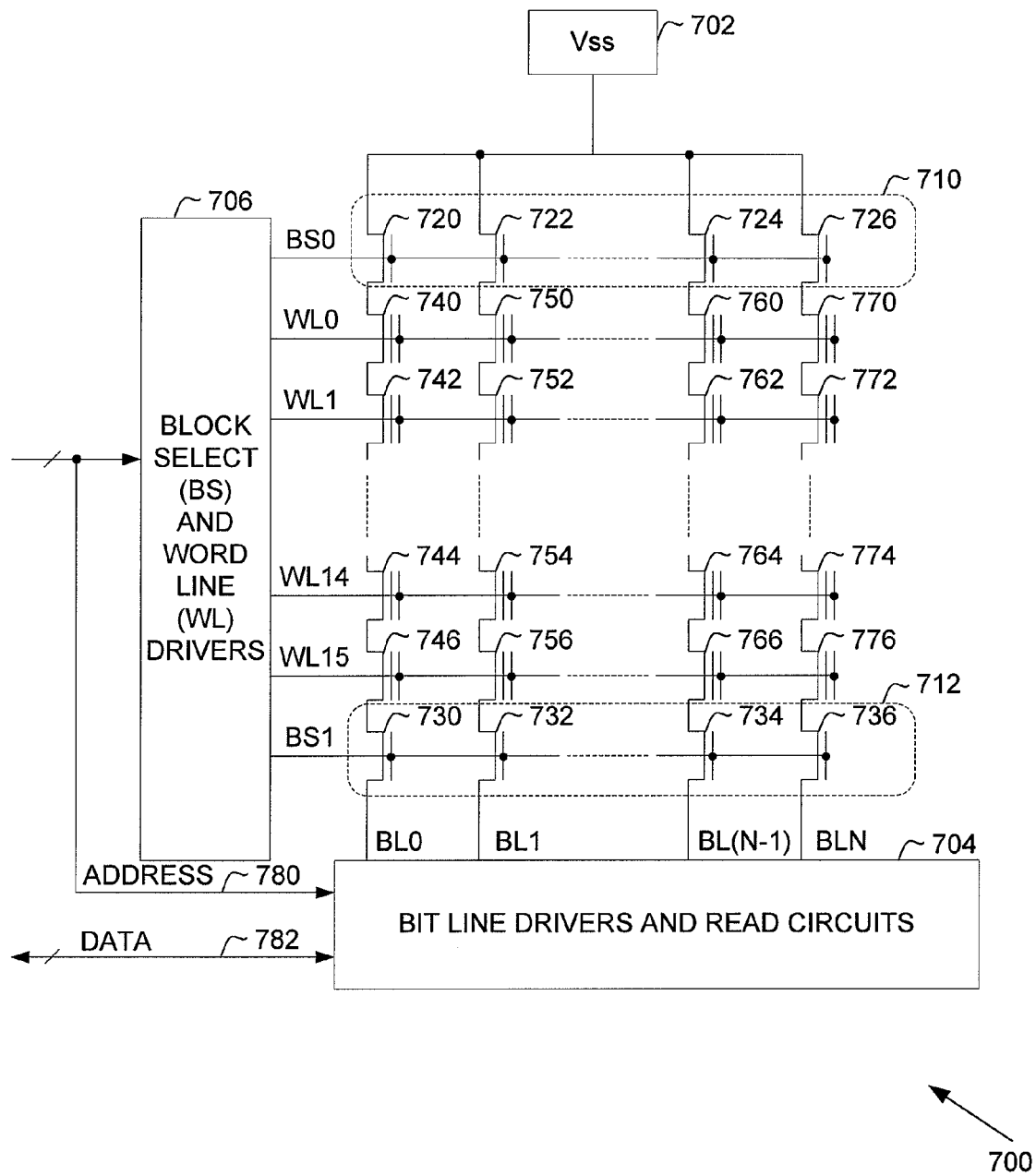
FIG. 7 shows a block implemented using charge storage transistors and associated logic in a NAND-type configuration, in accordance with an embodiment.

Different architectures, configurations, and specific cell structures may be employed to implement the memories described above and shown in FIGS. 2-6. FIG. 7 shows a block implemented using charge storage transistors and associated logic in a NAND-type configuration, in accordance with an embodiment. A block may comprise a voltage source Vss 702, bit line drivers and read circuits 704, block select and word line drivers 706, select transistors 720, 722, 724, 726 and 730, 732, 734, 736, charge storage transistors 740, 742, 744, 746, 750, 752, 754, 756, 760, 762, 764, 766, 770, 772, 774, 776, an address bus 780, and a data bus 782. Other relevant examples of NAND-type memories and their operation are given in the U.S. Pat. Nos. 7,023,736, 6,983,428, 6,771,536, and 6,522,580, all hereby incorporated by reference.

A NAND architecture 700 of one design has a number of memory cells, or charge storage transistors, such as 8, 16 or even 32, connected in series-connected strings between a bit line and a reference potential or voltage source through select transistors at either end of the chain of charge storage transistors. Word lines WL0, WL1, WL14, WL15 are connected with control gates of each cell in a series string. A plurality of column oriented strings of series-connected memory cells are connected between a common source 702 of a voltage Vss and one of bit lines BL0-BLN that are in turn connected with bit line drivers and read circuits 704 containing address decoders, drivers, read sense amplifiers, and other support circuitry.

Specifically, one such string comprises charge storage transistors 740, 742, 744, and 746 connected in series between select transistors 720 and 730 connected at opposite ends of the string. Strings formed by charge storage transistors 740, 742, 744, and 746, charge storage transistors 750, 752, 754, and 756, and charge storage transistors 760, 762, 764, and 766, are similarly connected between select transistor pairs 722 and 732, 724 and 734, and 726 and 736, respectively. In this example, each string contains sixteen charge storage transistors, but other numbers are possible. Word lines WL0-WL15 extend across one storage transistor of each string. For example, WL0 may be coupled to charge storage transistors 740, 750, 760, 770. Word lines WL0-WL15 are coupled to the block select and word line drivers 706 that contain address decoders and voltage source drivers of the word lines. Block select line BS0 may be coupled to select transistors 720, 722, 724, 726. Block select line BS1 may be coupled to select transistors 730, 732, 734, 736. The block select lines BS0 and BS1 may be coupled to block select and word line drivers 706.

The block select lines BS0 and BS1 control connection of all the strings in the block together to either the voltage source 702 and/or the bit lines BL0-BLN, and thus the bit line drivers and read circuits 704 through the select transistors sets 710 and 712. A controller may drive values on the address bus 780 and data bus 782 lines for programming operations, and a controller may drive a value on address bus 780 and read a value on data bus 782 for read operations.

Each row of charge storage transistors (memory cells) of the block may form a page that is programmed and read together. For example, charge storage transistors 740, 750, 760, 770 may form a page. An appropriate voltage is applied to the word line (WL) of such a page for programming or reading its data while voltages applied to the remaining word lines are selected to render their respective charge storage transistors conductive. In the course of programming or reading one row (page) of charge storage transistors, previously stored charge levels on unselected rows can be disturbed because of voltages applied across all the strings and to their associated word lines. This disturbance may also prevent programming of cells of a particular row after other cells in the row have been programmed. Multiple state flash memories are particularly sensitive to disturbance. The increased number of logic states stored in a charge storage transistor results in narrow threshold voltage ranges for individual states, so that small changes in charge level may produce a change in logic state. As data storage density is increased by using increased numbers of logic states in a cell, sensitivity to disturbance increases. Thus, it may not be possible to program data to cells in a row after other cells in that row are programmed without corrupting the data in the programmed cells. Thus, disturbance from subsequent programming of adjacent cells may define the page size. If cells in a row may not be programmed subsequent to programming other cells in the same row, then the row defines the minimum unit of programming. Thus, a row of cells may contain one page of data. In such a memory, if a group of cells in a row is programmed, the row is considered programmed even where some cells in the row contain no data. It is not efficient to have empty cells that cannot be subsequently programmed in the memory.

Empty cells in a programmed page may result from small numbers of sectors being received by the memory system at a time. For example, a single sector may be sent by a host to a memory system. The sector is stored in a page of the flash memory. The sector prevents subsequent writing to that page. In a memory system in which a page holds multiple sectors, this may be inefficient. For example, where a page comprises four sectors of data, a portion of the memory that could hold three sectors of data is left empty when a single sector is written to the page. As page sizes increase, the wasted space from such partially filled pages increases. Metapages may contain large numbers of sectors so storage may be particularly inefficient in memories that use metablocks. The problem is similar where two or more sectors are received but the number of sectors received is less than the number of sectors in a page. A similar problem also arises where the host may need to store less than one sector of data in a memory. If a host or other application needs to store two or more small sets of data, combining the sets into one or more sectors may be a more efficient use of storage space.

FIG. 8 shows an exemplary garbage collection operation, in accordance with an embodiment. The exemplary first physical block 800 may comprise four pages, where each page may comprise four sectors of data. Pages 0-3 are shown extending in the horizontal direction. Each page may contain four sectors of data designated as sector 0, sector 1, sector 2 and sector 3. A host or microprocessor within the memory system performs four write operations to the memory, and the data from the write operations are stored in the first physical block 800. The host sends the sector data 802 in a first write operation, and the data is stored in sector 0 of page 0. After the sector data 802 is stored, the remaining sectors in page 0 cannot be written to until the first physical block 800 is erased. Thus, sectors 1, 2 and 3 of page 0 are not programmed and remain empty (erased). After page 0 is programmed, the sector data 804, 806, and 808 are received, and stored as sectors 0, 1, and 2, respectively of page 1. Sector 3 of page 1 remains empty. After page 1 is programmed, the sector data 810, 812, and 814 is received and stored in sectors 0, 1, and 2, respectively, of page 2. Sector 3 of page 2 remains empty. After page 2 is programmed, the sector data 816 is received and stored in sector 0 of page 3. Sectors 1, 2 and 3 of page 3 remain empty.

The write of operation of sector data 816 may trigger a garbage collection operation, wherein valid sector data in the first physical block 800 may be copied to the second physical block 850. For example, the sector data 802, 804, 806, 808, 810, 812, 814, and 816 may be copied to the sector data 852, 854, 856, 858, 860, 862, 864, and 866, respectively, and stored in sectors 0-3 of page 1, of the second physical block 850 and sectors 0-3 of page 2, of the second physical block 850, respectively. Once the sector data has been copied, the first physical block 800 may be erased. Pages 2 and 3 of the second physical block 850 are unprogrammed and may store additional data.

The garbage collection described may result in a more efficient use of sectors within an exemplary block, but the worst-case time needed for a write operation may increase as a function of the time needed to perform a garbage collection operation. For example, the minimum time needed to program one sector of data such as sector data 816 may include the time needed to copy the sector data 802, 804, 806, 808, 810, 812, 814, and 816 from the first physical block 800, program pages 0 and 1 of the second physical block 850 with the sector data 852, 854, 856, 858, 860, 862, 864, and 866, and erase the first physical block 800. The worst-case time may increase as a function of the amount of valid sector data to be copied, which may increase as a function of the number of sectors in a page, and the number of pages in a block.

Referring back to FIG. 1C, during read and write operations the memory controller 110 generates and works with control data such as addresses, control, and status information. The speed in which control can be accessed will directly impact performance of these read and write operations. It would be desirable to maintain this type of control data in flash memory because flash memory is meant for storage and is non-volatile. Relatively static control data may be stored exclusively in memories 130, 140. However, with an intervening file management system between the controller and the flash memory, the control data can not be accessed as directly. Furthermore, some system control and directory data tends to be active and fragmented, which is not conducive to storing in a system with large size block erase. When relatively small amounts of stored data are read from the non-volatile memory, the worst-case read time may be dominated by the amount of time needed to access system control and directory data needed to complete the read operation.

Storing all of the control data in the RAM 116 may result in faster execution of host read and write operations to non-volatile memory, but controller RAM capacity may be insufficient to store all of the control data. A hierarchical and distributed scheme may be employed to store the more static control data in the non-volatile memories 130, 140 while locating the smaller amount of the more varying control data in the controller RAM 116 for more efficient update and access. In one embodiment, the RAM 116 acts as a cache for control data stored in memories 130, 140, so that in the event of a power shutdown or failure, the control data in the volatile controller RAM 116 may be rebuilt by scanning for a small set of control data in the memories 130, 140. An example of a hierarchal structure of storing control data is described in more detail in U.S. patent application Ser. No. 11/261,150, filed Oct. 27, 2005.

The size of the RAM 116 may be determined by amount of "fast access" storage that is needed. The storage size may include needs of the host 180 and the microprocessor 112. For example, system control and directory data, such as file allocation tables (FATs), are produced, accessed, and updated in order to complete some non-volatile memory read and write operations. However, if the silicon area cost to implement the total needed "fast access" storage is too high, less expensive random-access storage for small amounts of data in non-volatile memories 130, 140 may be substituted for part of the needed storage.

Figure 9A:
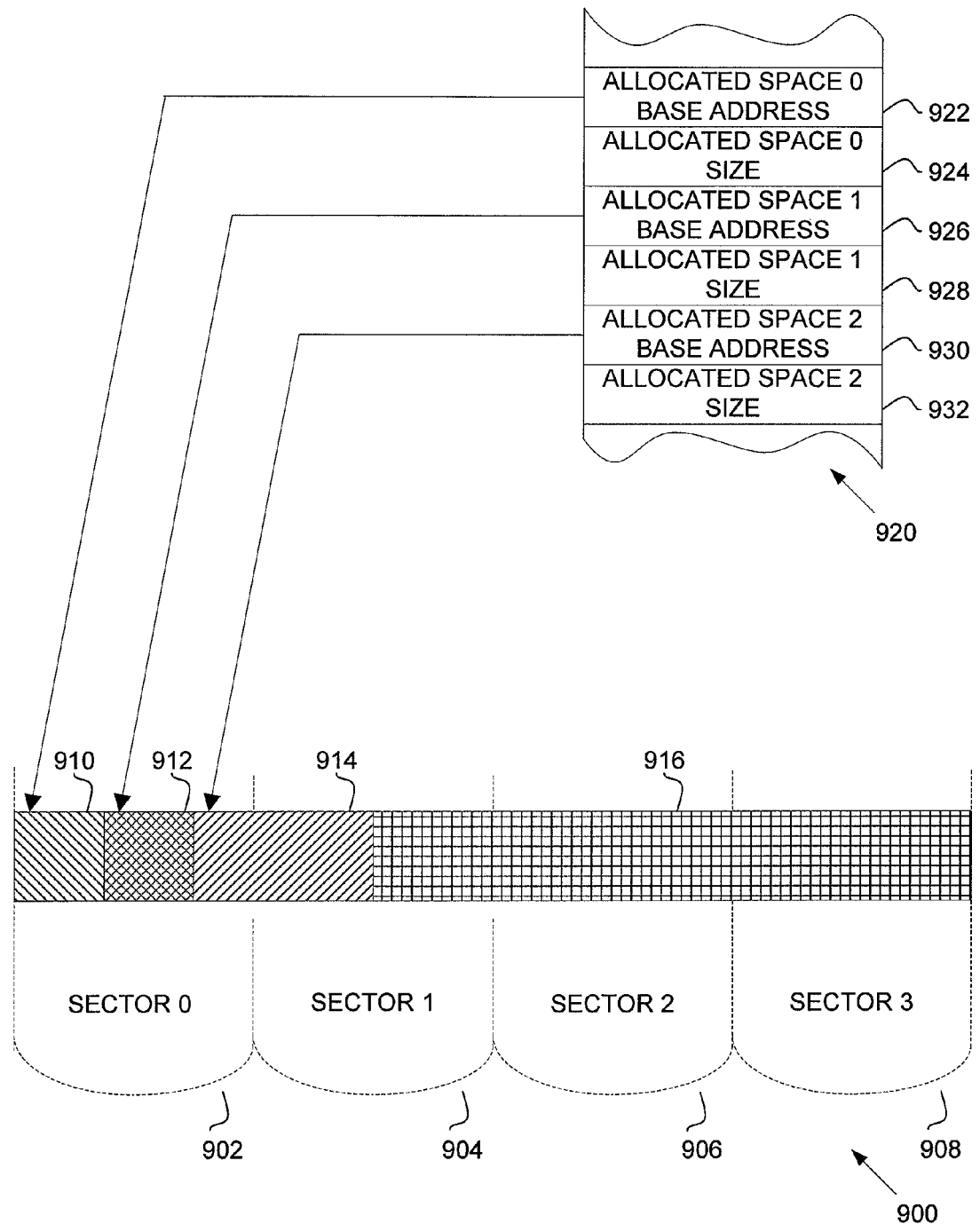
FIG. 9A shows an exemplary organization of a page as a Random Access Memory (RAM), in accordance with an embodiment.

FIG. 9A shows an exemplary organization of a page as a Random Access Memory (RAM), in accordance with an embodiment. The exemplary organization comprises a page 900 and a memory allocation table 920. In one embodiment, the page 900 is partitioned into four sectors 902, 904, 906, and 908. The page 900 may be divided into a plurality of allocated data spaces 910, 912, and 914, and an unallocated storage section 916. As shown in the example, allocated data space 914 may span the boundary of the sectors 902 and 904 in the page 900. Further, while the first allocated data space 910 is address-aligned with sector 902, the second allocated data space 912 and the third allocated data space 914 may not be aligned with a sector address boundary. The memory allocation table 920 may store information about the size and location of the plurality of allocated data spaces 910, 912, and 914. The memory allocation table 920 may be implemented in non-volatile memory, such as within the block containing the page 900, or in another block of memory. Referring back to FIG. 1C, the memory allocation table may also be implemented or mirrored in the RAM 116 of the controller 110. Returning to FIG. 9, the memory allocation table 920 may store a plurality of base addresses, 922, 926, and 930, which may be absolute address pointers, or relative address pointers, to the plurality of allocated data spaces, 910, 912, and 914, where a relative address pointer may be the address offset of an allocated data space within a page 900. The plurality of base addresses, 922, 926, and 930, may be byte, word, longword, or other increments of address smaller than a sector, depending on the minimum addressable unit of space within allocated data spaces 910, 912, and 914 in a particular embodiment of the invention. In this example, a word is two bytes, and a longword is four bytes. The memory allocation table 920 may also store a plurality of allocated data space size values 924, 928, 932, where allocated data space size value 924 indicates the size of allocated data space 910, the allocated data space size value 928 indicates the size of allocated data space 912, and the allocated data space size value 932 indicates the size of allocated data space 914.

While FIG. 9A shows contiguous allocated data spaces 910, 912, 914 beginning at the start of the first sector 902 in the page 900, in another embodiment of the invention, the allocated data spaces may be preceded by unallocated data space. In yet another embodiment of the invention, the allocated data spaces 910, 912, 914 may be separated by a plurality of unallocated data space locations. For example, if the total size of allocated data spaces 910, 912, 914 comprises more bytes than the size of sector 902, allocated data spaces 910, 912, 914 may be separated by a plurality of bytes to prevent any one allocated data space from spanning the boundary between adjacent sectors 902 and 904. Moreover, while FIG. 9A shows the base addresses, 922, 926, and 928 and allocated data space size values 924, 928, 932 stored in a table outside of page 900, other organizations of the base addresses and allocated data space size values may be possible. For example, some or all of the base addresses 922, 926, and 928 and the allocated data space size values 924, 928, 932 may be stored within page 900.

Figure 9B:
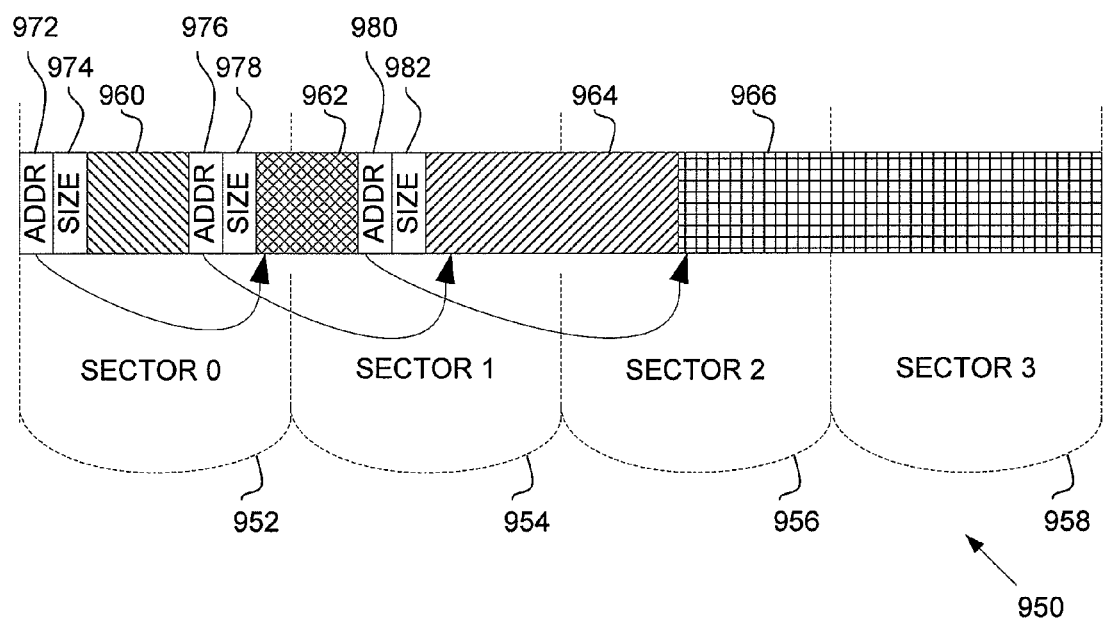
FIG. 9B shows another exemplary organization of a page as a Random Access Memory (RAM), in accordance with an embodiment.

FIG. 9B shows another exemplary organization of a page as a Random Access Memory (RAM), in accordance with an embodiment. A page 950 is partitioned into four sectors 952, 954, 956, and 958. The page 950 may be divided into a plurality of allocated data spaces 960, 962, and 964, unallocated data space 966, base addresses, 972, 976, and 980, and allocated data space size values 974, 978, 982. Each allocated data space is preceded by a base address pointer and an allocated data space size value. For example, an allocated data space 960 is preceded by a base addresses 972 and an allocated data space size value 974, where the base addresses 972 points to the next allocated data space 962, and the allocated data space size value 974 contains the size of allocated data space 960. Similarly, the allocated data space 962 is preceded by a base addresses 976 and an allocated data space size value 978, where the base addresses 976 points to the next allocated data space 964, and the allocated data space size value 978 contains the size of the allocated data space 962. The allocated data space 964 is preceded by a base addresses 980 and an allocated data space size value 982, where the base addresses 980 points to the unallocated data space 966, and the allocated data space size value 982 contains the size of the allocated data space 964. Numerous other organizations of a page data space are readily apparent to one of skill in the art.

Figure 10:
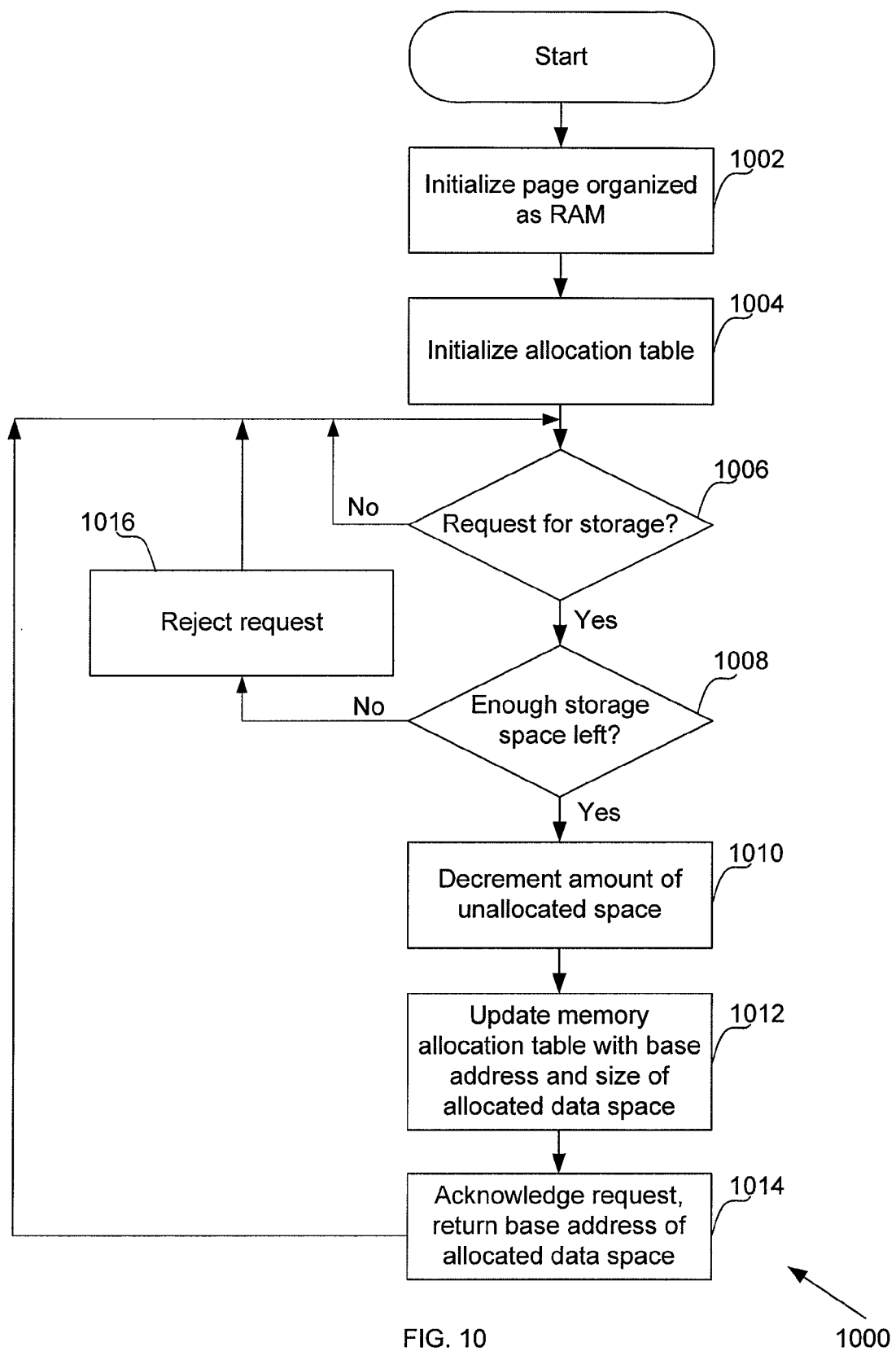
FIG. 10 shows a memory allocation algorithm for a page of memory organized as a Random Access Memory (RAM), in accordance with an embodiment.

FIG. 10 shows a memory allocation algorithm for a page of memory organized as a Random Access Memory (RAM), in accordance with an embodiment. At step 1002, the algorithm reserves an initial page of memory for use as RAM. Control passes to step 1004, where the algorithm initializes an allocation table that will contain information on the base address and size of each allocated data space within the page used as RAM. Control passes to step 1006, where the algorithm waits for a request for storage. If a request is not received, control remains at step 1006. If a request for storage is received, control passes to step 1008, where the storage space request is evaluated. The algorithm evaluates if the size of the storage space request is less than the available data space in the page. If it is not, control passes to step 1016, where the request is rejected, and control passes back to step 1006, where the algorithm waits for another request. If the algorithm determines that there is enough data space to accommodate the request, control passes to step 1010, where the amount of unallocated data space in the page is decremented by the size of the space allocated. Control then passes to step 1012, where the memory allocation table is updated with the base address and the size of the data space allocated. Control then passes to step 1014, where the algorithm acknowledges that the request can be accommodated, and returns the base address of the allocated data space. Control then returns to step 1006, where the algorithm waits for another storage request.

While FIG. 10 depicts a particular memory allocation algorithm, other memory allocation algorithms may be utilized as well. For example, the exemplary algorithm 1000 may not "free" memory once it has been allocated. The algorithm 1000 may also allocate data space in a contiguous fashion. Referring back to FIG. 9, algorithm 1000 may receive three memory requests, and may allocate contiguous data spaces 910, 912, 914 in order, where the next data space to be allocated is adjacent to the previously allocated data space. However, those skilled in the art will realize that other memory allocation algorithms may also be adapted to process memory requests for a page of memory organized as RAM, including allocation algorithms that may "free" or de-allocate allocated data space, and algorithms that may allocate memory in a non-contiguous fashion.

Figure 11:
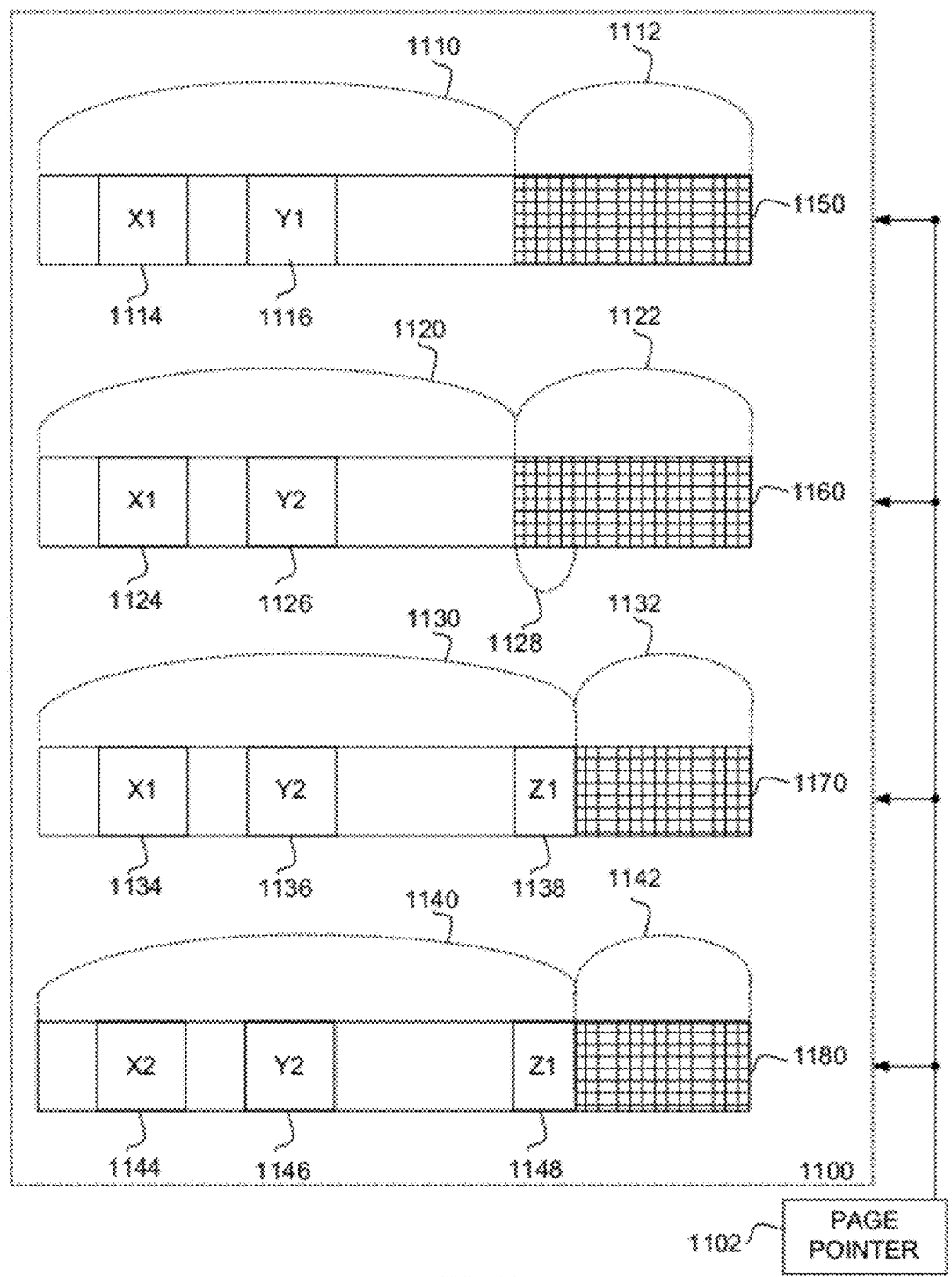
FIG. 11 shows exemplary steps for updating a page of memory organized as a Random Access Memory (RAM) in response to read, memory allocation, and write operations, in accordance with an embodiment.

FIG. 11 shows exemplary steps for updating a page of memory organized as a Random Access Memory (RAM) in response to read, memory allocation, and write operations, in accordance with an embodiment. A block 1100 comprises a plurality of pages 1150, 1160, 1170, and 1180. A page 1150 is divided into an allocated storage section 1110, and an unallocated storage section 1112. The allocated storage section 1110 comprises a plurality of allocated data spaces, each allocated data space corresponding to a successful memory allocation request. For purposes of demonstrating the exemplary steps, a first allocated data space 1114, containing data marked X1, and a second allocated data space 1116, containing data marked Y1, are shown as portions of the allocated storage section 1110.

In the example of FIG. 11, a write request to update the allocated data space 1116 with contents Y2 is received. The request may be transmitted as an address of the allocated data space 1116, and the data Y2 to be written. The address in the write request may be in the form of an address offset within the page 1150. The entire page 1150, or the allocated storage section 1110, may be copied into a buffer, where the contents Y1 are replaced with the contents Y2. The page 1160 is programmed with the contents of the buffer. Effectively, in response to the write request, the contents of the allocated storage section 1120 are programmed with the contents of the allocated storage section 1110, except that contents Y2 are programmed into the allocated data space 1126 instead of contents Y1 of the allocated data space 1116. The contents of the unallocated storage section 1122 may be programmed with the contents of the unallocated storage section 1112, may be programmed with specified values, or may be left unprogrammed. A pointer 1102 indicating the location of the page of memory organized as a Random Access Memory (RAM) is updated to point to the page 1160. The pointer 1102 may be implemented in non-volatile memory or volatile memory. If the pointer 1102 is implemented in non-volatile memory, its value may be mirrored to volatile memory such as the RAM 116 in FIG. 1C. If the pointer 1102 is implemented in volatile memory, or mirrored in volatile memory, the value of the pointer 1102 may be more quickly obtained to process the read of the page 1150 needed as part of the write operation to a page organized as RAM. The pointer 1102 is only updated after a write operation to the allocated storage section 1120 is completed, so if the pointer 1102 is implemented in non-volatile memory, in the event of a power interruption, the pointer 1102 points to the last successfully programmed page 1150. After the update, the page 1150 holds an out-of-date, invalid copy of the RAM contents, the page 1160 holds the current copy of the RAM contents, and the pointer 1102 points to page 1160.

Continuing the example of FIG. 11, a memory allocation request is received, and a portion 1128 of the unallocated storage section 1160 may be allocated in response to the request. A write request to write the allocated but unprogrammed space 1128 with contents Z1 is received. In an embodiment where the minimum unit of programming is a page, the unprogrammed space 1128 may not be programmed once the allocated storage section 1120 contents have been programmed. A page 1170 is programmed with the contents of the allocated storage section 1120 of the page 1160, and the contents Z1 specified by the write request. The contents of unallocated storage section 1132 may be programmed with the corresponding contents of the unallocated storage section 1122, may be programmed with specified values, or may be left unprogrammed. A pointer 1102 indicating the location of the page of memory organized as a Random Access Memory (RAM) is updated to point to the page 1170. After the write operation, the page 1160 holds an out-of-date, invalid copy of the RAM contents, page 1170 holds the current copy of the RAM contents, and the pointer 1102 points to page 1170.

Continuing the example of FIG. 11, a request to read data stored in the allocated data space 1136 is received. The request may be transmitted as an address and amount of data to read. The amount of data may be expressed in a number of bytes, words, longwords, or other increment smaller than a sector depending on the minimum addressable size of an allocated data space within the page organized as RAM. The address in a read request may be the address of the allocated data space 1136 or an address within allocated data space 1136. The address in a read request may be in the form of an address offset within page 1170. The address may be aligned to a byte, word, longword, or other address boundary smaller than a sector, depending on the minimum addressable size of an allocated data space within the page organized as RAM. In one example, a word is two bytes, and a longword is four bytes. The pointer 1102 may supplement the address information provided in the read request. If pointer 1102 is implemented or mirrored in volatile memory such as the RAM 116 in FIG. 1C, the value of pointer 1102 may be more quickly obtained to process the read of the page 1170 required as part of the read operation. In response to the request, data corresponding to the requested amount of data at the specified address is returned. Because the RAM contents may not be modified by the read operation, a pointer 1102 indicating the location of the page of memory organized as a Random Access Memory (RAM) may still point to page 1170, because page 1170 may still holds the current copy of the RAM contents.

Continuing the example of FIG. 11, a write request to update the allocated data space 1134 with contents X2 is received. The request may be transmitted as an address of the allocated data space 1134, and the data X2 to be written. The address in the write request may be in the form of an address offset within the page 1170. The entire page 1170, or the allocated storage section 1130, may be copied into a buffer, where the contents X1 are replaced with the contents X2. The page 1180 is then programmed with the contents of the buffer. Effectively, in response to the write request, the contents of the allocated storage section 1140 are programmed with the contents of the allocated storage section 1130, except that the contents X2 are programmed into the allocated data space 1144 instead of the contents X1 of the allocated data space 1134. The contents of the unallocated storage section 1142 may be programmed with the contents of the unallocated storage section 1132, may be programmed with specified values, or may be left unprogrammed. A pointer 1102 indicating the location of the page of memory organized as a Random Access Memory (RAM) is updated to point to the page 1180. After the update, the page 1170 holds an out-of-date, invalid copy of the current RAM contents, and the page 1180 holds the current copy of the RAM contents, and the pointer 1102 points to page 1180.

As shown in the above examples of programming pages 1160, 1170, and 1180, a page organized as Random Access Memory may be written to by reading the contents from one page, updating the read contents with plurality of bytes at a specified address with specified values, writing the updated contents to an unprogrammed page, and updating a pointer 1102 to point to the newly programmed page. Read commands may access data stored in the page pointed to by pointer 1102.

While the above examples demonstrate the replacement of the entire contents of allocated data space 1116 with Y2, and the entire contents of allocated data space 1134 with X2, smaller amounts of data may be updated. For example, if the minimum addressable allocated data space within the page organized as RAM is one byte, then a write operation to allocated data space 1116 may update as little as one byte of data, and contents Y1 in allocated data space 1116 and Y2 in allocated data space 1126 will differ by only one byte. Similarly, if the minimum addressable allocated data space within the page organized as RAM is one word, then a write operation may update as little as one word (two bytes) of data. In another example, if the minimum addressable allocated data space within the page organized as RAM is one longword, then a write operation may update as little as one longword (four bytes) of data.

If the block 1100 contains only four pages 1150, 1160, 1170, 1180, then the next write request to update the page 1180 of memory organized as a Random Access Memory (RAM) may utilize a page in another block to store the updated RAM contents. This write operation may trigger a garbage collection operation, where valid data is copied from the block 1100 to another block, and wherein the data in the block 1100 may be erased. However, the pages 1150, 1160, and 1170 in the block 1100 contain obsolete, invalid versions of the contents of the RAM. Only the current RAM page 1190 has to be modified and copied to a new block. The pointer 1102 is updated after the page 1190 has been copied. The page 1100 may be erased once the pointer 1102 is updated. As shown above, an operation to update the RAM contents within a block involves copying one page, 1150, 1160, 1170 to an updated page 1160, 1170, 1180, respectively, and updating the pointer 1102. Therefore, where a block is allocated to store only current and obsolete versions of a page organized as RAM, a write request that triggers a garbage collection may take approximately the same amount of time as a write request that does not trigger garbage collection.

Figure 12A:
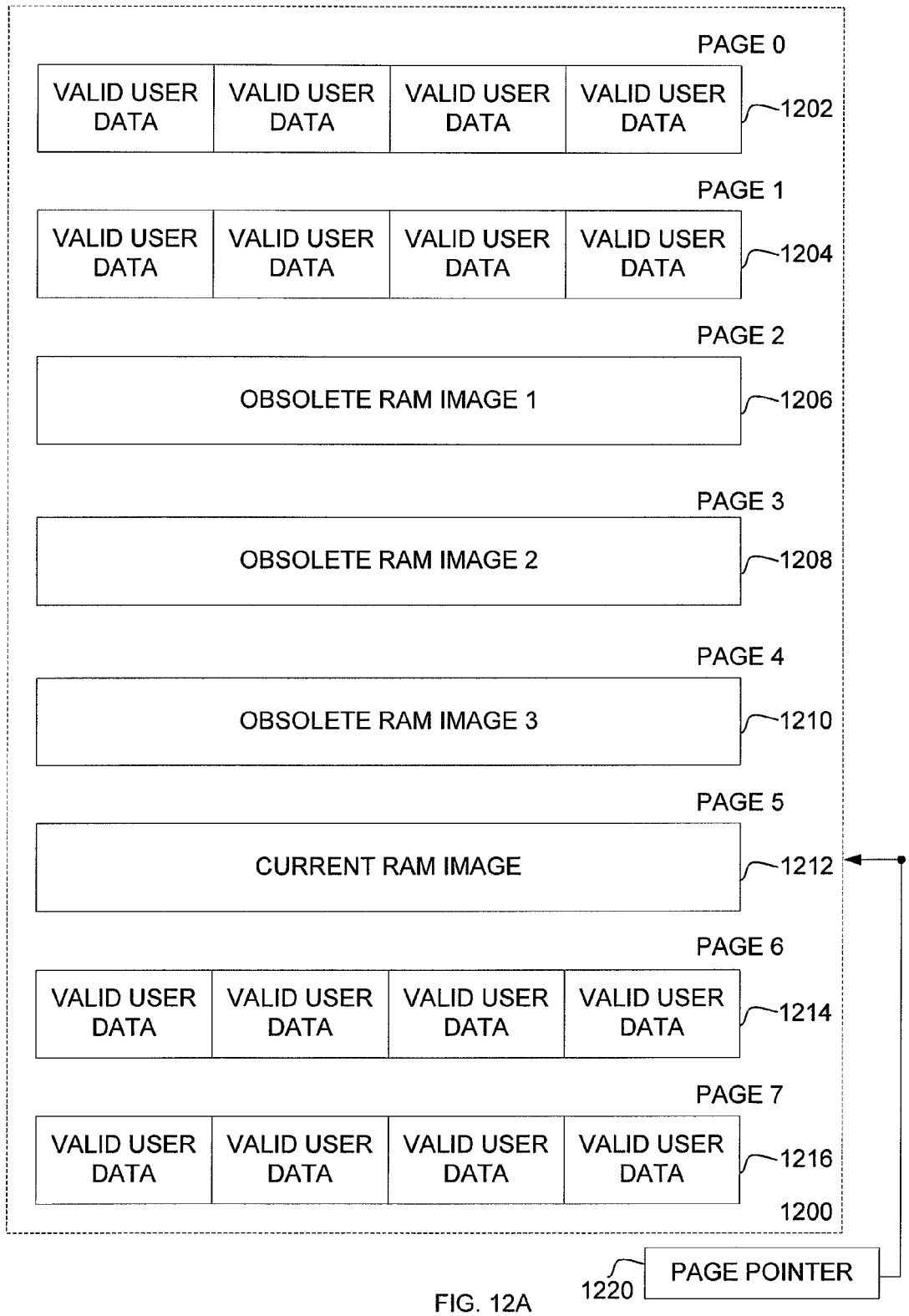
FIG. 12A shows an exemplary block that stores current and obsolete pages of memory organized as a Random Access Memory (RAM), along with other user data, in accordance with an embodiment.

While FIG. 11 shows a block dedicated to storing current or obsolete pages of memory organized as a Random Access Memory (RAM), other embodiments may be possible. FIG. 12A shows an exemplary block that stores current and obsolete pages of memory organized as a Random Access Memory (RAM), along with other user data, in accordance with an embodiment. The exemplary block 1200 comprises eight pages, 1202, 1204, 1206, 1208, 1210, 1212, 1214, and 1216. A page 1212 contains a current page of memory organized as a RAM, pointed to by pointer 1220. Pages 1206, 1208, and 1210 store obsolete and thus invalid versions of page 1212. Pages 1202, 1204, 1214, and 1216 contain valid user data stored by another process. If a garbage collection operation is triggered by an update of the current page organized as a RAM 1212, valid data from user pages 1202, 1204, 1214, and 1216, and the current page of memory organized as RAM 1212 will be copied to a new block. Unlike the garbage collection depicted in FIG. 11, the valid data from additional user pages 1202, 1204, 1214, and 1216 that must be copied increases the worst-case time needed to complete a write operation to a page organized as RAM above the time to read, update, and write one page of data. The worst-case write time may increase as the number of user pages stored in block increases, and as the size of block increases. For example, if a block comprises 64 pages, where one page is organized as a RAM, and where 40 pages contained valid user data, then, assuming each page contains four sectors of valid data, 160 sectors of data from 40 pages may have to be copied during a garbage collection triggered by a write operation to update the page organized as RAM.

Several methods may improve the worst-case write time where the block containing a page organized as RAM is shared with pages of valid data written by other processes. In a first approach, the page organized as a RAM is shared a plurality of pages of inefficiently stored valid data written by with a plurality of processes. Returning to the example above, a block again comprises 64 pages, where one page is organized as a RAM, and where 40 pages store valid data from a plurality of inefficient processes. In this example, each page of data may store only one sector of valid data each, because the plurality of inefficient processes trigger a new page write whenever one sector needs to be stored. In this case, only 40 sectors of valid data may be copied when a garbage collection triggered by a write operation to update the page organized as RAM.

Figure 12B:
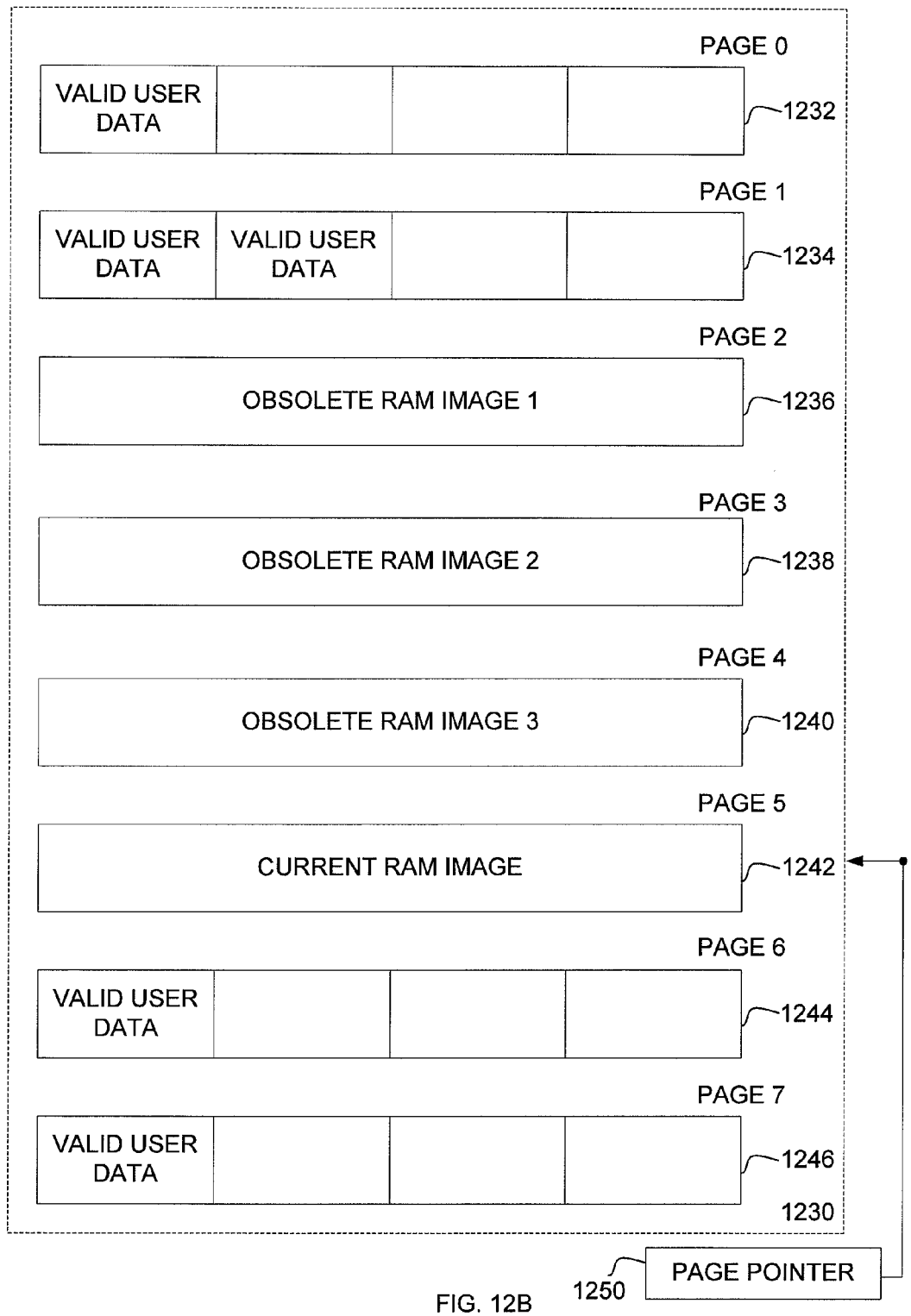
FIG. 12B shows an exemplary block that stores current and obsolete pages of memory organized as a Random Access Memory (RAM), along with other inefficiently stored user data, in accordance with an embodiment.

FIG. 12B shows an exemplary block that stores current and obsolete pages of memory organized as a Random Access Memory (RAM), along with other inefficiently stored data, in accordance with an embodiment. An exemplary block 1230 comprises eight pages, 1232, 1234, 1236, 1238, 1240, 1242, 1244, and 1246. A page 1242 contains a current page of memory organized as a RAM, pointed to by a pointer 1250. Pages 1236, 1238, and 1240 store obsolete and thus invalid versions of page 1232. Pages 1232, 1234, 1244, and 1246 valid data inefficiently stored by another process. Where the pages 1202, 1204, 1214, 1216 in FIG. 12A store 16 sectors of valid data, only 5 sectors of valid data are stored in the pages 1232, 1234, 1244, 1246 of FIG. 12B. If a garbage collection operation is triggered by an update of current the page organized as a RAM 1242, valid data from pages 1232, 1234, 1244, and 1246, and the current page of memory organized as RAM 1242, will be copied to a new block. Unlike the garbage collection depicted in FIG. 12A, where 16 sectors of valid data from pages 1202, 1204, 1214, and 1216 must be copied, here, only 5 sectors of valid data from pages 1232, 1234, 1244, and 1246 must be copied to a new block, thus reducing the worst-case time needed to complete a write operation to a page organized as RAM.

Figure 12C:
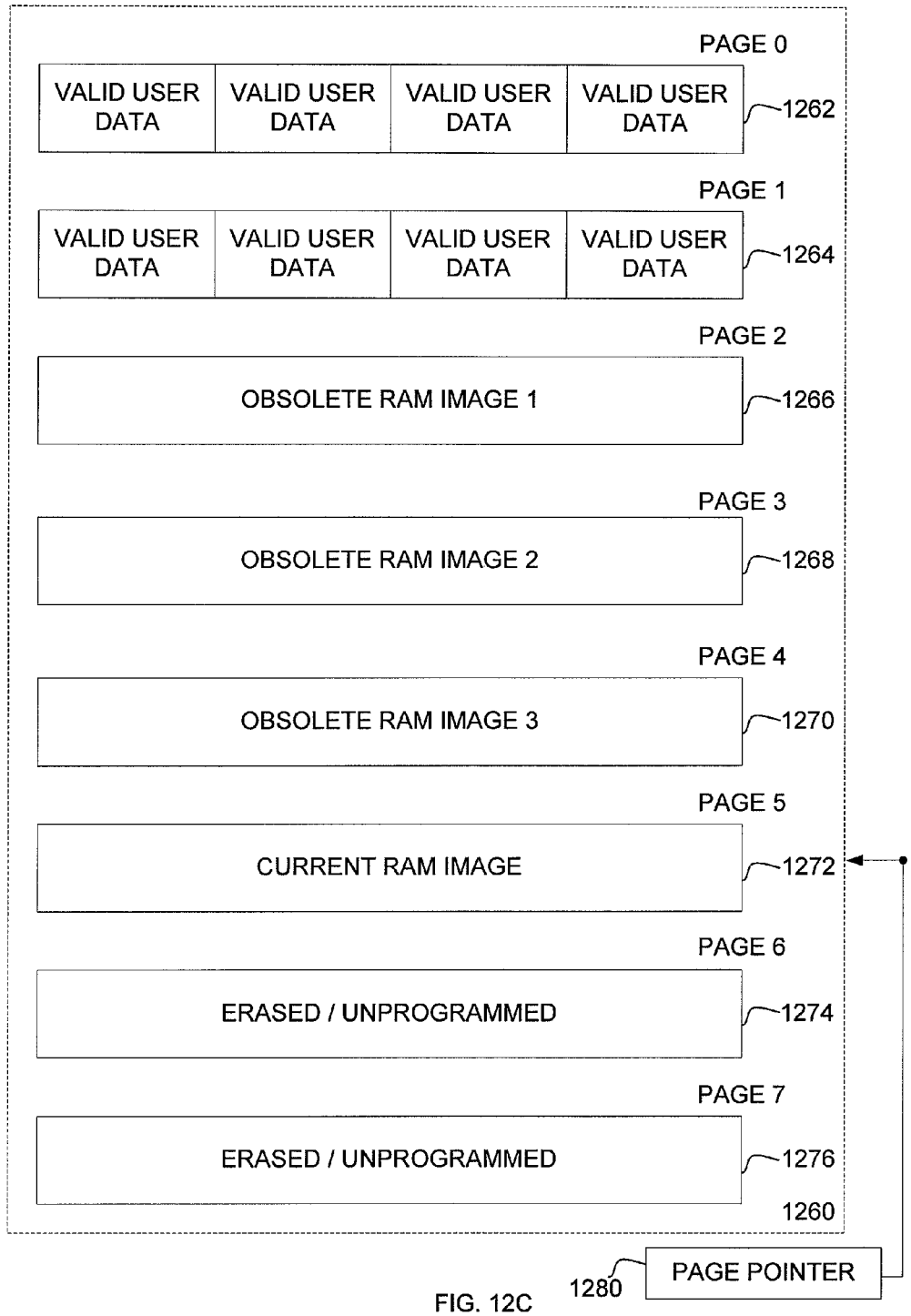
FIG. 12C shows an exemplary block that stores current and obsolete pages of memory organized as a Random Access Memory (RAM), along with other user data, in accordance with an embodiment.

In a second approach to improving worst-case write time where a page organized as RAM is shared with pages of valid data written by other processes, garbage collection is scheduled before every page of the block is programmed. FIG. 12C shows an exemplary block that stores current and obsolete pages of memory organized as a Random Access Memory (RAM), along with other data, in accordance with an embodiment. An exemplary block 1260 comprises eight pages, 1262, 1264, 1266, 1268, 1270, 1272, 1274, and 1276. A page 1272 contains a current page of memory organized as a RAM, pointed to by pointer 1280. Pages 1266, 1268, and 1270 store obsolete and thus invalid versions of page 1272. Pages 1262 and 1264 contain valid data stored by another process, and pages 1274 and 1276 are unprogrammed. A garbage collection operation may be triggered by the number of unprogrammed pages reaching a threshold. For example, if the current the page organized as a RAM 1272 is updated, resulting in the page 1272 becoming obsolete, and programming of page 1274 to hold the new RAM contents, then the number of unprogrammed pages will decrease to one. The RAM update operation may complete, and a process that compares the unprogrammed pages to a threshold may initiate a garbage collection operation (if, for example the threshold is one), where valid data from user pages 1262, 1264, and the current page of memory organized as RAM 1274, may be copied to a new block.

Because the garbage collection is scheduled by comparing the number of unprogrammed pages to a threshold, the copying of valid data from pages 1262, 1264, and 1274 may be partially or fully complete before another update of the page organized as RAM is requested, thus reducing the worst-case write time. Alternatively, if an RAM update request is received before garbage collection of the block 1260 is complete, garbage collection may be suspended while the current page organized as a RAM 1274 may be updated into the remaining unprogrammed page 1276. When the RAM update is complete, garbage collection may be resumed. In other words, triggering garbage collection when the number of unprogrammed pages in a block reaches a threshold decouples the garbage collection process from a page write operation, so that the worst case page write time may not be the time needed to write a page plus the time needed for garbage collection of block 1260.

Figure 13A:
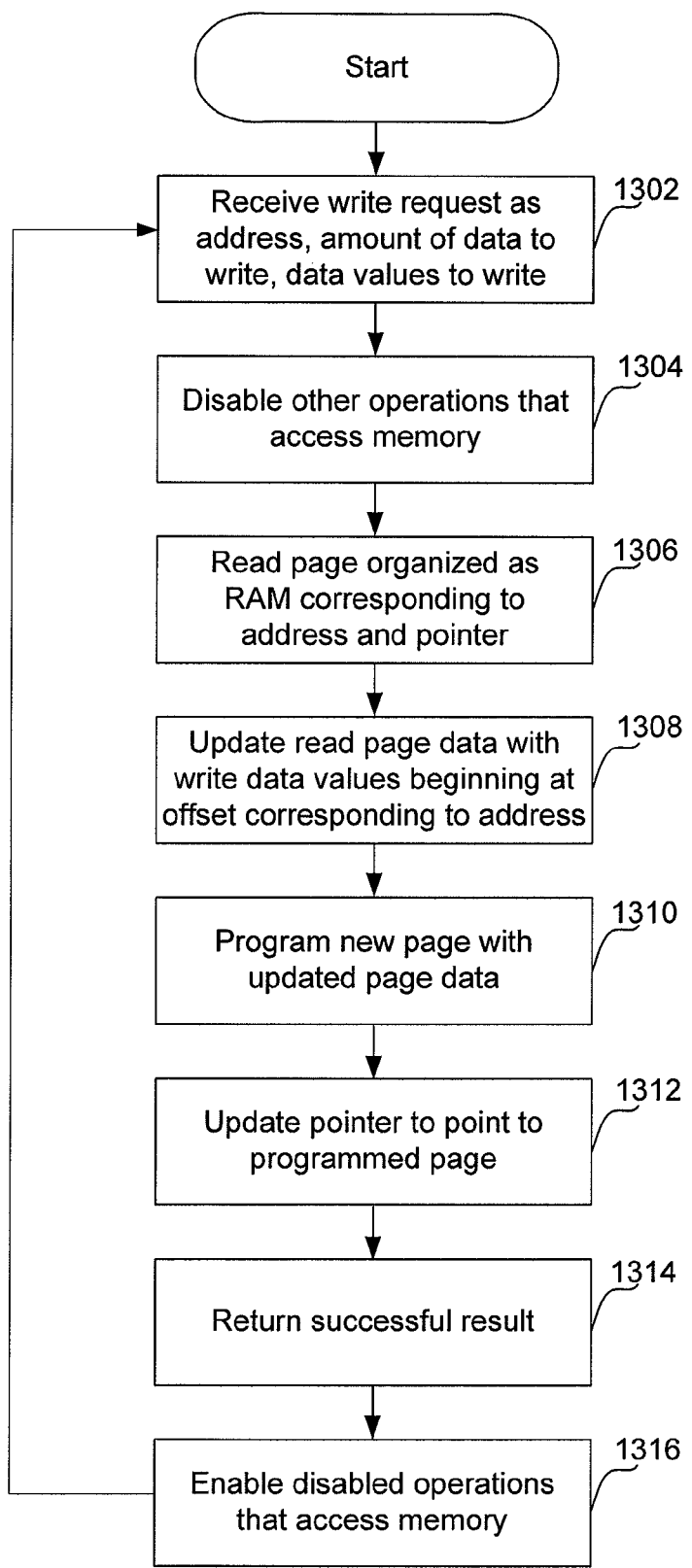
FIG. 13A is a flow diagram of exemplary steps for disabling other processes during a write operation to a page organized as RAM, in accordance with an embodiment.

Worst-case write time may also be improved by disabling other processes that may access the non-volatile memory during a write operation to a page organized as RAM. Referring back to FIG. 1C, the microprocessor 112 may perform read and write accesses to memories 130, 140 in order to maintain reliable operation of the card. Some of the microprocessor accesses may include read or write operations to implement wear leveling, read scrub, or other algorithms. One or more of these operations may occur during a microprocessor 112 or host 180 write to a page organized as RAM. Thus, the worst-case time to complete a write operation to a page organized as RAM may increase. FIG. 13A is a flow diagram of exemplary steps for disabling other processes during a write operation to a page organized as RAM, in accordance with an embodiment. At step 1302, the algorithm receives a write operation request to a page organized as RAM, including address, amount of data to be written, and data values to be written. Control passes to step 1304, where microprocessor algorithms that may access the memories or may otherwise delay the write operation may be disabled. Control passes to step 1306, where a page organized as RAM corresponding to the specified address is read from the memory. An address pointer may supplement the address information specified in the write request. At step 1308, a specified number of bytes of the read page contents at a location corresponding to the specified address are updated with the specified data supplied in the write operation request. Control passes to step 1310, where the modified read page data is programmed to a new page. At step 1312, the pointer that indicates the location of the page organized as RAM is updated to point to the page programmed in step 1310. At step 1314, successful completion of the write operation may be signaled. At step 1316, the microprocessor algorithms disabled in step 1304 may be enabled. Control passes to step 1302 to wait for another write operation request.

Figure 13B:
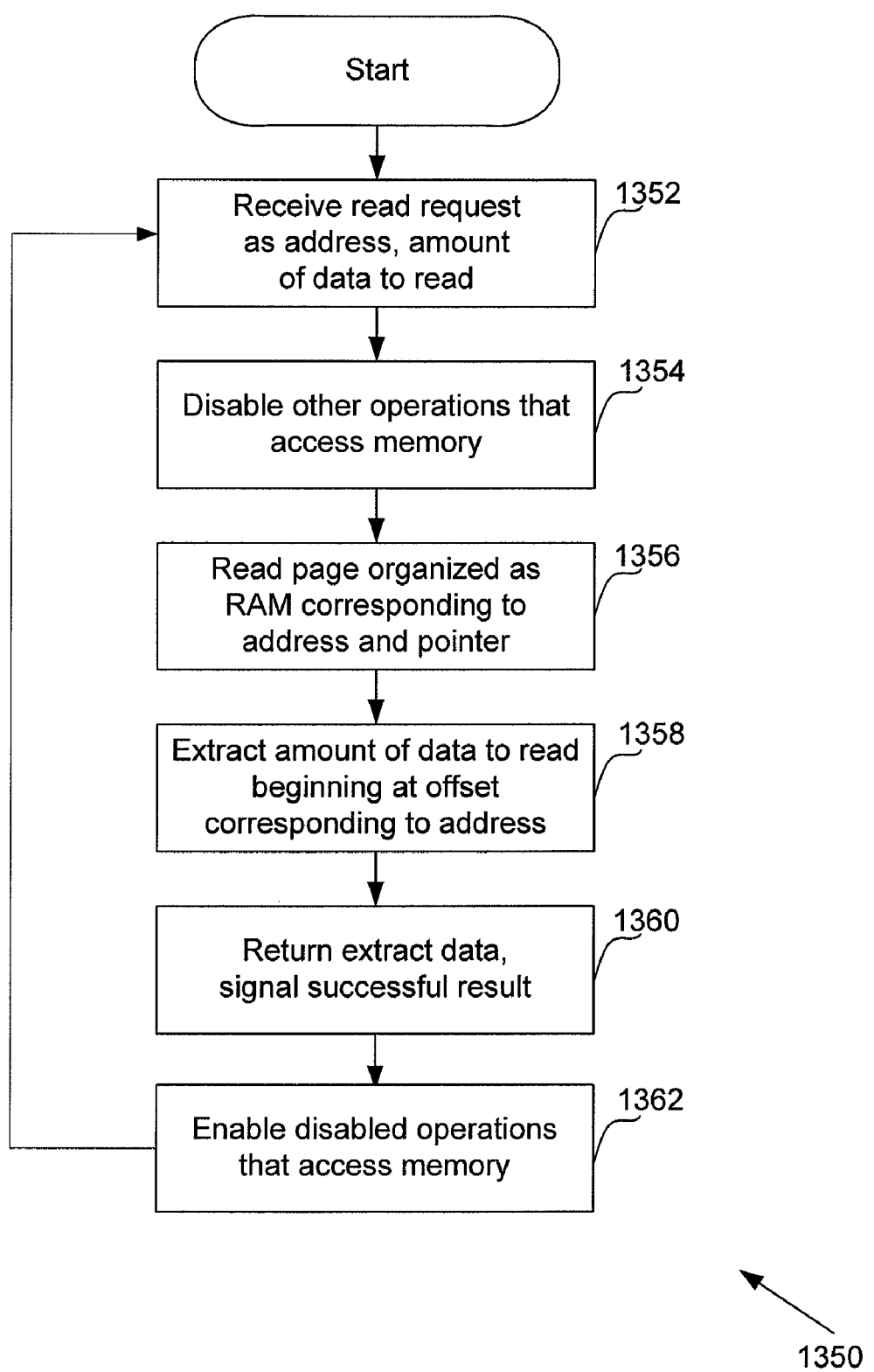
FIG. 13B is a flow diagram of exemplary steps for disabling other processes during a read operation from a page organized as RAM, in accordance with an embodiment.

Worst-case read time may also be improved by disabling other processes that may access the non-volatile memory during a read operation to a page organized as RAM. Referring back to FIG. 1C, microprocessor 112 may perform read and write accesses to memories 130, 140 in order to maintain reliable operation of the card. Some of the microprocessor accesses may include read or write operations to implement wear leveling, read scrub, or other algorithms. One or more of these operations may occur during a microprocessor 112 or host 180 read from a page organized as RAM. Thus, the worst-case time to complete a read operation from a page organized as RAM may increase. FIG. 13B is a flow diagram of exemplary steps for disabling other processes during a read operation from a page organized as RAM, in accordance with an embodiment. At step 1352, the algorithm receives a read operation request from a page organized as RAM, including address and amount of data to be read. Control passes to step 1354, where microprocessor algorithms that may access the memories or may otherwise delay the read operation may be disabled. Control passes to step 1356, where a page organized as RAM corresponding to the specified address is read from the memory. An address pointer may supplement the address information specified in the read request. At step 1358, a specified number of bytes of the read page contents at a location corresponding to the specified address are extracted from the read page. At step 1360, a plurality of extracted read page bytes are returned, and successful completion of the read operation may be signaled. At step 1362, the microprocessor algorithms disabled in step 1354 may be enabled. Control passes to step 1352 to wait for another read operation request.

Figure 14:
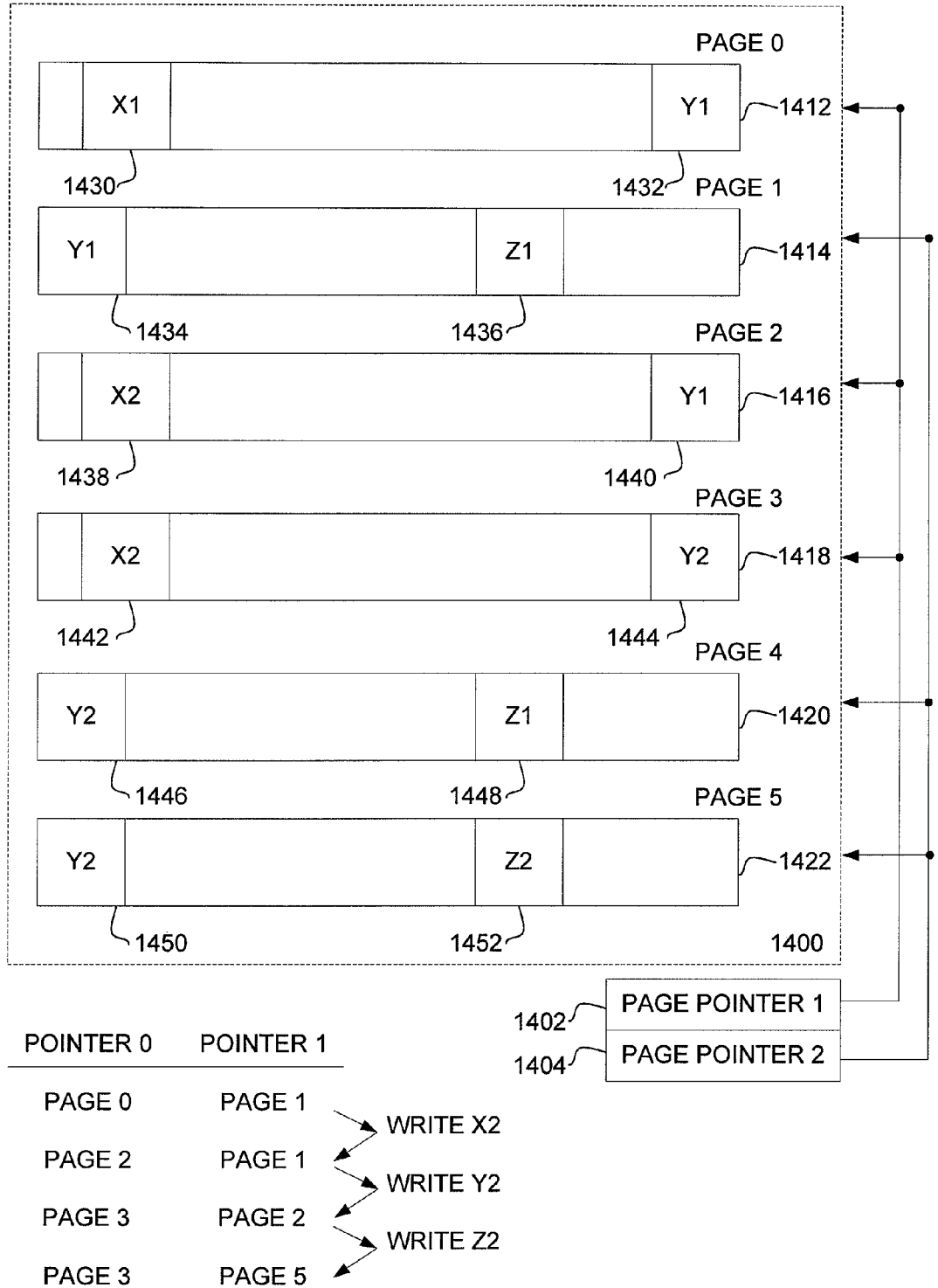
FIG. 14 shows exemplary steps for updating a plurality of pages of memory organized as a Random Access Memory (RAM) in response to read and write operations, in accordance with an embodiment.

While the foregoing FIGS. 9A-13B and accompanying text describe a single page organized as RAM, other embodiments may be possible. FIG. 14 shows exemplary steps for updating a plurality of pages of memory organized as a Random Access Memory (RAM) in response to read and write operations, in accordance with an embodiment. A block 1400 comprises a plurality of pages 1412, 1414, 1416, 1418, 1420, and 1422. In this example, pages 1412 and 1414 contain the initial contents of a memory organized as a RAM. The pages 1412 and 1414 contain allocated and unallocated storage sections. For purposes of demonstrating the exemplary steps, a page 1412 contains a first allocated data space 1430, containing data marked X1, the pages 1412 and 1414 contain second allocated data space comprising data space 1432 and 1434, containing data marked Y1, and a page 1414 contains a third allocated data space 1436, containing data marked Z1. The second allocated data space spans a physical boundary between the pages 1412 and 1414 to demonstrate that a memory allocation algorithm may allocate a data space that spans the boundary between pages grouped as a RAM.

A first pointer 1402 points to the location of the page 1412, and a second pointer 1404 points to the location of the page 1414. In combination, first pointer 1402 and second pointer 1404 indicate the current location of the two pages organized as a RAM. The first pointer 1402 and the second pointer 1404 may be implemented in non-volatile memory or volatile memory. If the pointers 1402 and 1404 are implemented in non-volatile memory, their values may be mirrored to volatile memory such as the RAM 116 in FIG. 1C. If the pointers 1402 and 1404 are implemented in volatile memory, or mirrored in volatile memory, the value of the pointers 1402 and 1404 may be more quickly obtained to process the read operation of the pages 1412 or 1414 that may be needed as part of an exemplary write or read operation.

In the example of FIG. 14, a write request to update the allocated data space 1430 with contents X2 is received. The request may be transmitted as an address of the allocated data space 1430, and the data X2 to be written. The address in the write request may be in the form of an address offset within the pages 1412 and 1414. The entire page 1412, or the allocated storage section within the page 1412, may be copied into a buffer, where the contents X1 are replaced with the contents X2. The page 1416 is programmed with the contents of the buffer. Effectively, in response to the write request, the allocated storage section of page 1416 is programmed with the contents of the allocated storage section of page 1412, except that the contents X2 are programmed into the allocated data space 1438 instead of the contents X1 of the allocated data space 1430. The contents of the unallocated storage section within the page 1416 may be programmed with the contents of the unallocated storage section within the page 1412, may be programmed with specified values, or may be left unprogrammed. The first pointer 1402 indicating the location of one of the pages of memory organized as a Random Access Memory (RAM) is updated to point to the page 1416. The first pointer 1402 is only updated after a write operation to the allocated storage section of page 1416 is completed, so if the first pointer 1402 is implemented in non-volatile memory, in the event of a power interruption, the first pointer 1402 points to the last successfully programmed page 1412. After the update, the page 1412 holds an out-of-date, invalid copy of the current content one half of the RAM, and pages 1416 and 1414 hold the current copy of the RAM contents. Because the allocated data space 1430 is contained entirely within page 1412, the page 1414 may be left unmodified, and the second pointer 1404 may continue to point to the page 1414.

Continuing the example of FIG. 14, a request to read data stored in the allocated data space 1436 is received. The request may be transmitted as an address and an amount of data to read. The address in a read request may be the address of the allocated data space 1436 or an address within the allocated data space 1436. The address in the read request may be in the form of an address offset within the pages 1416 and 1414. In response to the request, data corresponding to the requested amount of data at the specified address is returned. Because the RAM contents were not modified by the read operation, the first pointer 1402 and the second pointer 1404 indicating the location of the pages of memory organized as a Random Access Memory (RAM) still points to the pages 1416 and 1414, respectively.

Continuing the example of FIG. 14, a write request to update the second allocated data space, comprising data spaces 1440 and 1434, containing data marked Y1, with contents Y2 is received. The request may be transmitted as an address of the allocated data space 1440, and the data Y2 to be written. The address in the write request may be in the form of an address offset within pages 1416 and 1414. The entire page 1416 and the entire page 1414, or the allocated storage sections within the pages 1416 and 1414, may be copied into a buffer, where the contents Y1 are replaced with the contents Y2. The pages 1418 and 1420 are programmed with the contents of the buffer. Effectively, in response to the write request, the contents of the allocated storage sections in the pages 1418 and 1420 are programmed with the contents of the allocated storage sections of pages 1416 and 1414, respectively, except that the contents Y2 are programmed into the allocated data space 1444 instead of the contents Y1 of the allocated data space 1440, and the contents Y2 are programmed into the allocated data space 1446 instead of the contents Y1 of the allocated data space 1434. The contents of the unallocated storage sections within the pages 1418 and 1420 may be programmed with the contents of the corresponding unallocated storage sections within the pages 1416 and 1414, respectively, may be programmed with specified values, or may be left unprogrammed. The first pointer 1402 indicating the location of the first page of memory organized as a Random Access Memory (RAM) is updated to point to the page 1418. The second pointer 1404 indicating the location of the second page of memory organized as a Random Access Memory (RAM) is updated to point to the page 1420. The first pointer 1402 is only updated after a write operation to the allocated storage section of page 1418 is completed, so if the first pointer 1402 is implemented in non-volatile memory, in the event of a power interruption, the first pointer 1402 points to the last successfully programmed page 1416. The second pointer 1404 is only updated after a write operation to the allocated storage section of page 1420 is completed, so if the second pointer 1404 is implemented in non-volatile memory, in the event of a power interruption, the second pointer 1404 points to the last successfully programmed page 1414. After the update, the pages 1414 and 1416 hold an out-of-date, invalid copy of the current content the RAM, and the pages 1418 and 1420 hold the current copy of the RAM contents.

Continuing the example of FIG. 14, a write request to update the allocated data space 1448 with the contents Z2 is received. The request may be transmitted as an address of the allocated data space 1448, and the data Z2 to be written. The address in the write request may be in the form of an address offset within the pages 1418 and 1420. The entire page 1420, or the allocated storage section within page 1420, may be copied into a buffer, where the contents Z1 are replaced with the contents Z2. The page 1422 is programmed with the contents of the buffer. Effectively, in response to the write request, the allocated storage section of page 1422 is programmed with the contents of allocated storage section of page 1420, except that contents Z2 are programmed into allocated data space 1452 instead of contents Z1 of allocated data space 1448. The contents of unallocated storage section within page 1422 may be programmed with the contents of unallocated storage section within page 1420, may be programmed with specified values, or may be left unprogrammed. The second pointer 1404 indicating the location of one of the pages of memory organized as a Random Access Memory (RAM) is updated to point to the page 1422. The second pointer 1404 is only updated after a write operation to the allocated storage section of page 1422 is completed, so if the second pointer 1404 is implemented in non-volatile memory, in the event of a power interruption, the second pointer 1404 points to the last successfully programmed page 1420. After the update, the page 1420 holds an out-of-date, invalid copy of the current content one half of the RAM, and the pages 1418 and 1422 hold the current copy of the RAM contents. Because the allocated data space 1448 is contained entirely within the page 1420, the page 1418 may be left unmodified, and the first pointer 1402 may continue to point to the page 1418.

As shown in the above examples of programming of the pages 1416, 1418, 1420, and 1422, a plurality of pages organized as Random Access Memory may be written to by reading the contents from one page, updating the read contents with plurality of bytes at a specified address with specified values, writing the updated contents to a plurality of unprogrammed pages, and updating a plurality of pointers 1402, 1404 to point to the newly programmed page or pages. Read commands may access data stored in the pages pointed to by the pointers 1402 and 1404.

While the above examples demonstrate the replacement of the entire contents of allocated data space 1430 with X1, and the entire contents of allocated data space 1436 with Z2, smaller amounts of data may be updated. For example, if the minimum addressable allocated data space within the pages organized as RAM is one byte, then a write operation to allocated data space 1430 may update as little as one byte of data, and contents X1 in allocated data space 1430 and X2 in allocated data space 1438 will differ by only one byte. Similarly, if the minimum addressable allocated data space within the pages organized as RAM is one word, then a write operation may update as little as one word (two bytes) of data. In another example, if the minimum addressable allocated data space within the page organized as RAM is one longword, then a write operation may update as little as one longword (four bytes) of data.

While FIG. 14 depicts two pages organized as a RAM within the same block, other embodiments may utilize a multiple pages across a metablock. Returning to FIG. 6, all pages of the blocks 626, 632, 642, 654 of the metablock 650 may be erased together, and a metapage comprising one page from each block 626, 632, 642, 654 of the metablock 650 may be programmed together. Therefore, a metapage comprising a plurality of pages may be organized as Random Access Memory.

Figure 15:
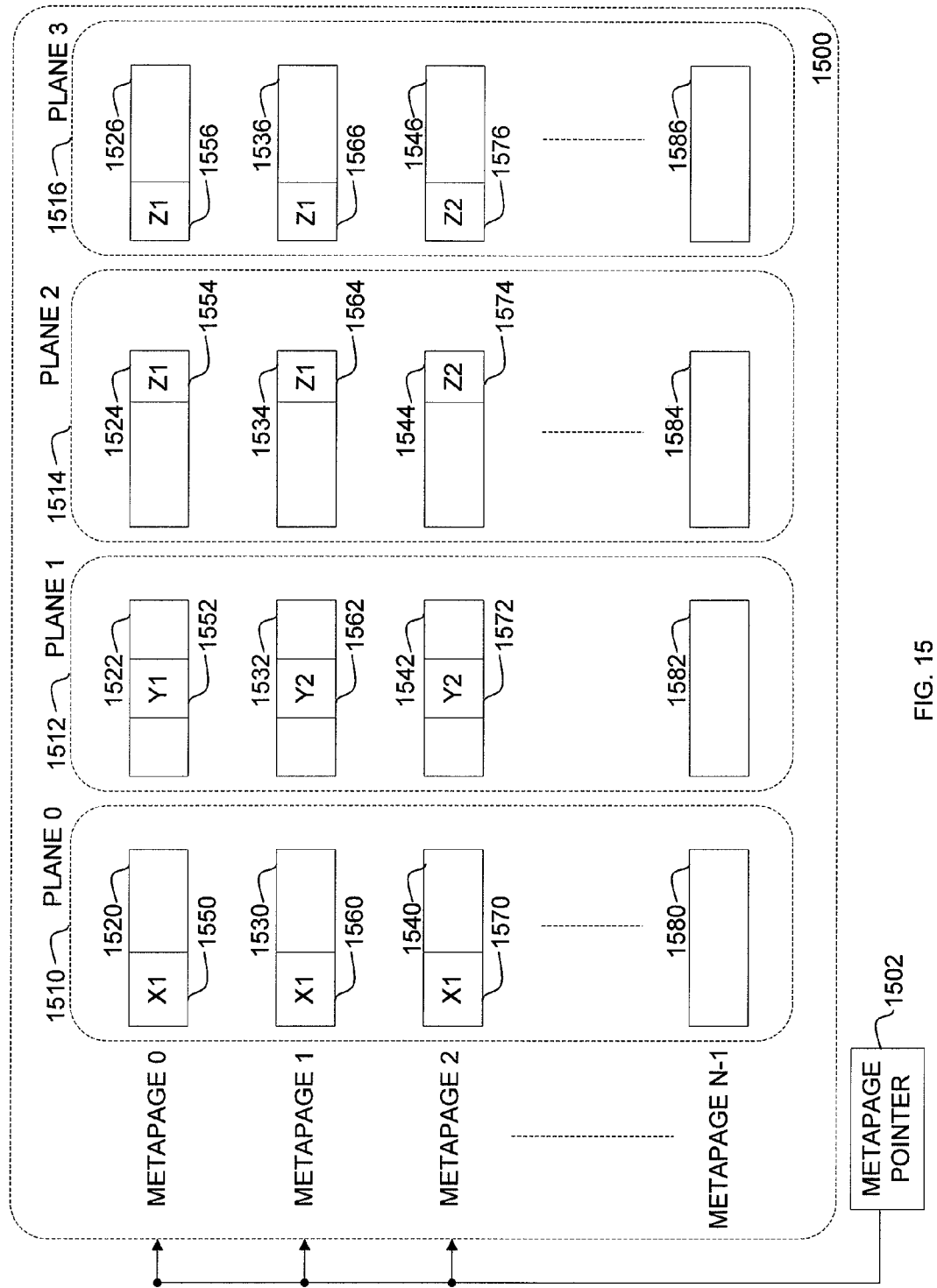
FIG. 15 shows exemplary steps for updating a plurality of pages of memory organized as a Random Access Memory (RAM) in response to read and write operations, in accordance with an embodiment.

FIG. 15 shows exemplary steps for updating a plurality of pages of memory organized as a Random Access Memory (RAM) in response to read and write operations, in accordance with an embodiment. A metablock 1500 comprises a plurality of linked blocks 1510, 1512, 1514, 1516. A block 1510 comprises a plurality of N pages 1520, 1530, 1540, 1560. A block 1512 comprises a plurality of N pages 1522, 1532, 1542, 1562. A block 1514 comprises a plurality of N pages 1524, 1534, 1544, 1564. A block 1516 comprises a plurality of N pages 1526, 1536, 1546, 1566. Pages 1520, 1522, 1524, and 1526 are organized as a Random Access Memory, a metapage comprising pages 1520, 1522, 1524, and 1526 is pointed to by a pointer 1502. The pointer 1502 may indicate the current location of a metapage organized as a RAM. The pointer 1502 may be implemented in non-volatile memory or volatile memory. If the pointer 1502 is implemented in non-volatile memory, its value may be mirrored to volatile memory such as a RAM 116 in FIG. 1C. If the pointer 1502 is implemented in volatile memory, or mirrored in volatile memory, the value of the pointer 1502 may be more quickly obtained to process the read of the pages 1520, 1522, 1524, 1526 that may be needed as part of an exemplary write or read operation.

For purposes of demonstrating the exemplary steps, the page 1520 contains a first allocated data space 1550, containing data marked X1, the page 1522 contains a first allocated data space 1552, containing data marked Y1, the page 1524 contains a second allocated data space 1554, containing data marked Y1, and pages 1524 and 1526 contain a third allocated data space comprising data space 1554 and 1556, containing data marked Z1. The third allocated data space spans a physical boundary between the pages 1524 and 1526 to demonstrate that a memory allocation algorithm may allocate a data space that spans the boundary between pages grouped as a RAM.

In the example of FIG. 15, a write request to the update allocated data space 1552 with contents Y2 is received. The request may be transmitted as an address of the allocated data space 1552, and the data Y2 to be written. The address in the write request may be in the form of an address offset within the metapage formed by the pages 1520, 1522, 1524, 1526. The page 1522 may be copied into a buffer, where contents Y1 are replaced with contents Y2. The page 1532 is programmed with the contents of the buffer. Effectively, in response to the write request, the page 1532 is programmed with the contents of page 1522, except that contents Y2 are programmed into the allocated data space 1562 instead of contents Y1 of the allocated data space 1552. The page 1520 is copied to the page 1530, the page 1524 is copied to the page 1534, and the page 1526 is copied to the page 1536, so that the allocated data space 1560 of page 1530 contains data contents X1, and the allocated data space formed by data spaces 1564 and 1566 of the pages 1534 and 1536 contain data contents Z1. Programming of the pages 1530, 1532, 1534, and 1536 may occur simultaneously as part of a single metapage operation. A pointer 1502 indicating the location of the metapage of memory organized as a Random Access Memory (RAM) is updated to point to pages 1530, 1532, 1534, and 1536. The pointer 1502 is only updated after a write operation to the pages 1530, 1532, 1534, and 1536 is complete, so if the pointer 1502 is implemented in non-volatile memory, in the event of a power interruption, the pointer 1502 points to the last successfully programmed metapage formed by the pages 1520, 1522, 1524, and 1526. After the update, the pages 1520, 1522, 1524, and 1526 hold an out-of-date, invalid copy of the current contents RAM, and the metapage formed by the pages 1530, 1532, 1534, and 1536 hold the current copy of the RAM contents.

Continuing the example of FIG. 15, a write request to update allocated data space formed by the data spaces 1564 and 1566 with contents Z2 is received. The request may be transmitted as an address of allocated data space formed by the data spaces 1564 and 1566, and the data Z2 to be written. The address in the write request may be in the form of an address offset within the metapage formed by the pages 1530, 1532, 1534, 1536. The pages 1534 and 1536 may be copied into a buffer, where contents Z1 are replaced with contents Z2. Page 1544 and 1546 are programmed with the contents of the buffer. Effectively, in response to the write request, pages 1544 and 1546 are programmed with the contents of page 1534 and 1536, respectively, except that the partial contents Z2 are programmed into allocated data space 1574 instead of the partial contents Z1 of allocated data space 1564, and the remaining contents Z2 are programmed into allocated data space 1576 instead of the remaining contents Z1 of allocated data space 1566.

The page 1530 is copied to the page 1540, and the page 1532 is copied to the page 1542, so that the allocated data space 1570 of the page 1530 contains the data contents X1, and the allocated data space 1572 of the page 1542 contains the data contents Y2. Programming of the pages 1540, 1542, 1544, and 1546 may occur simultaneously as part of a single metapage operation. A pointer 1502 indicating the location of the metapage of memory organized as a Random Access Memory (RAM) is updated to point to the pages 1540, 1542, 1544, and 1546. The pointer 1502 is only updated after a write operation to the pages 1540, 1542, 1544, and 1546 is complete, so if the pointer 1502 is implemented in non-volatile memory, in the event of a power interruption, the pointer 1502 points to the last successfully programmed metapage formed by the pages 1530, 1532, 1534, and 1536. After the update, the pages 1540, 1542, 1544, and 1546 hold an out-of-date, invalid copy of the current contents RAM, and the metapage formed by the pages 1540, 1542, 1544, and 1546 hold the current copy of the RAM contents.

Continuing the example of FIG. 15, a request to read data stored in the allocated data space 1570 is received. The request may be transmitted as an address and an amount of data to read. The address in a read request may be the address of the allocated data space 1570 or an address within the allocated data space 1570. The address in the read request may be in the form of an address offset within the metapage formed by the pages 1540, 1542, 1544, and 1546. In response to the request, data corresponding to the requested number of bytes at the specified address is returned. Because the RAM contents were not modified by the read operation, the pointer 1502 indicating the location of the pages of memory organized as a Random Access Memory (RAM) still points to the metapage formed by the pages 1540, 1542, 1544, and 1546.

As shown in the above examples of programming metapages formed by the pages 1530, 1532, 1534, and 1536, and 1540, 1542, 1544, and 1546, a metapage organized as Random Access Memory may be written to by reading the contents of a metapage, updating the read contents with plurality of bytes at a specified address with specified values, writing the updated contents to an unprogrammed metapage, and updating a pointer 1502 to point to the newly programmed page or pages. Read commands may access data stored in the metapages pointed to by pointer 1502.

Figure 16A:
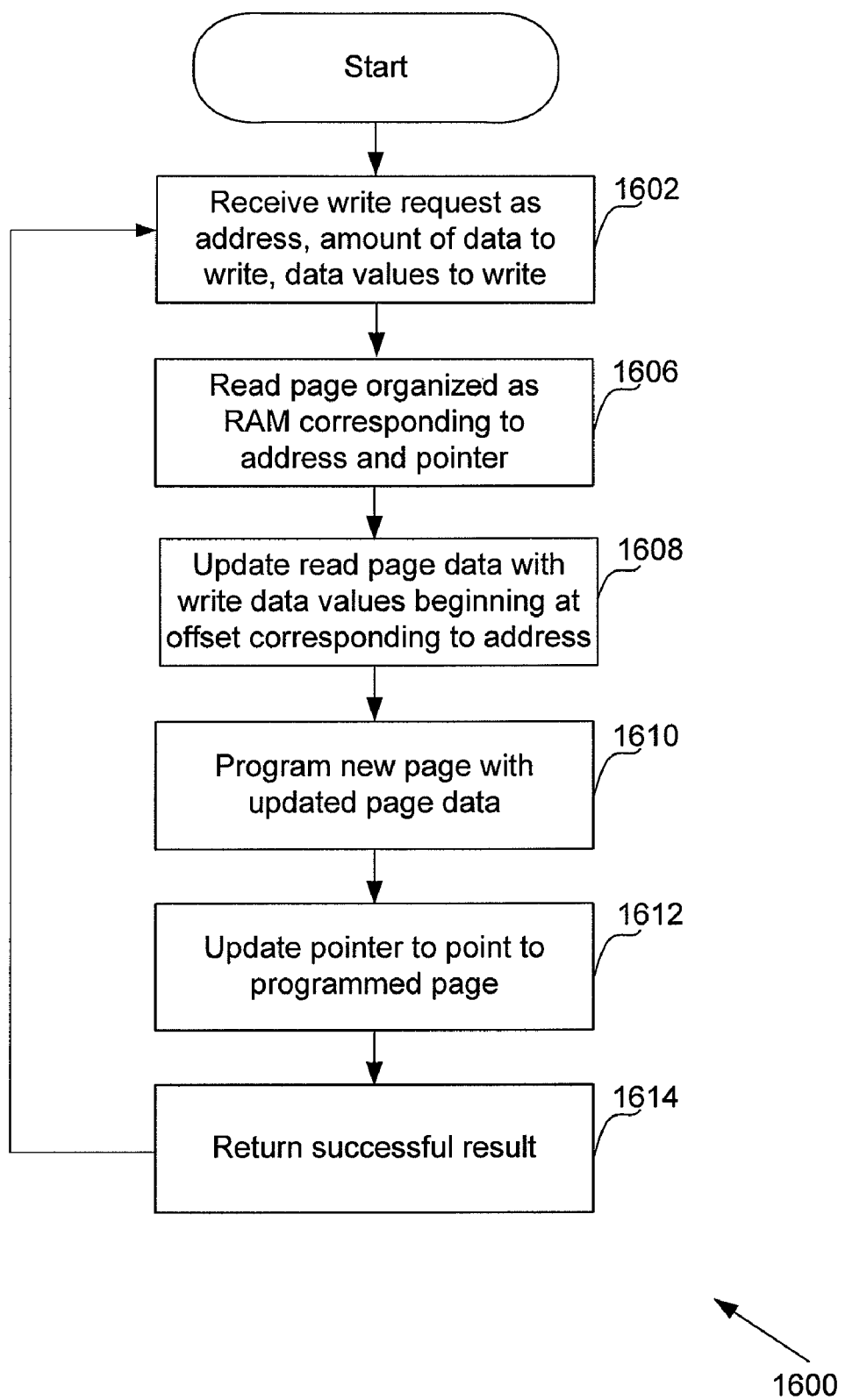
FIG. 16A is a flow diagram of exemplary steps for processing a write operation request to a page organized as RAM, in accordance with an embodiment.

FIG. 16A is a flow diagram of exemplary steps for processing a write operation request to a page organized as RAM, in accordance with an embodiment. At step 1602, the algorithm receives a write operation request to a page organized as RAM, including address, number of bytes to be written, and data values to be written. Control passes to step 1606, where a page organized as RAM corresponding to the specified address is read from the memory. An address pointer may supplement the address information specified in the write request. At step 1608, a specified number of bytes of the read page contents at a location corresponding to the specified address are updated with the specified data supplied in the write operation request. Control passes to step 1610, where the modified read page data is programmed to a new page. At step 1612, the pointer that indicates the location of the page organized as RAM is updated to point to the page programmed in step 1610. At step 1614, successful completion of the write operation may be signaled. Control then passes to step 1602 to wait for another write operation request.

Figure 16B:
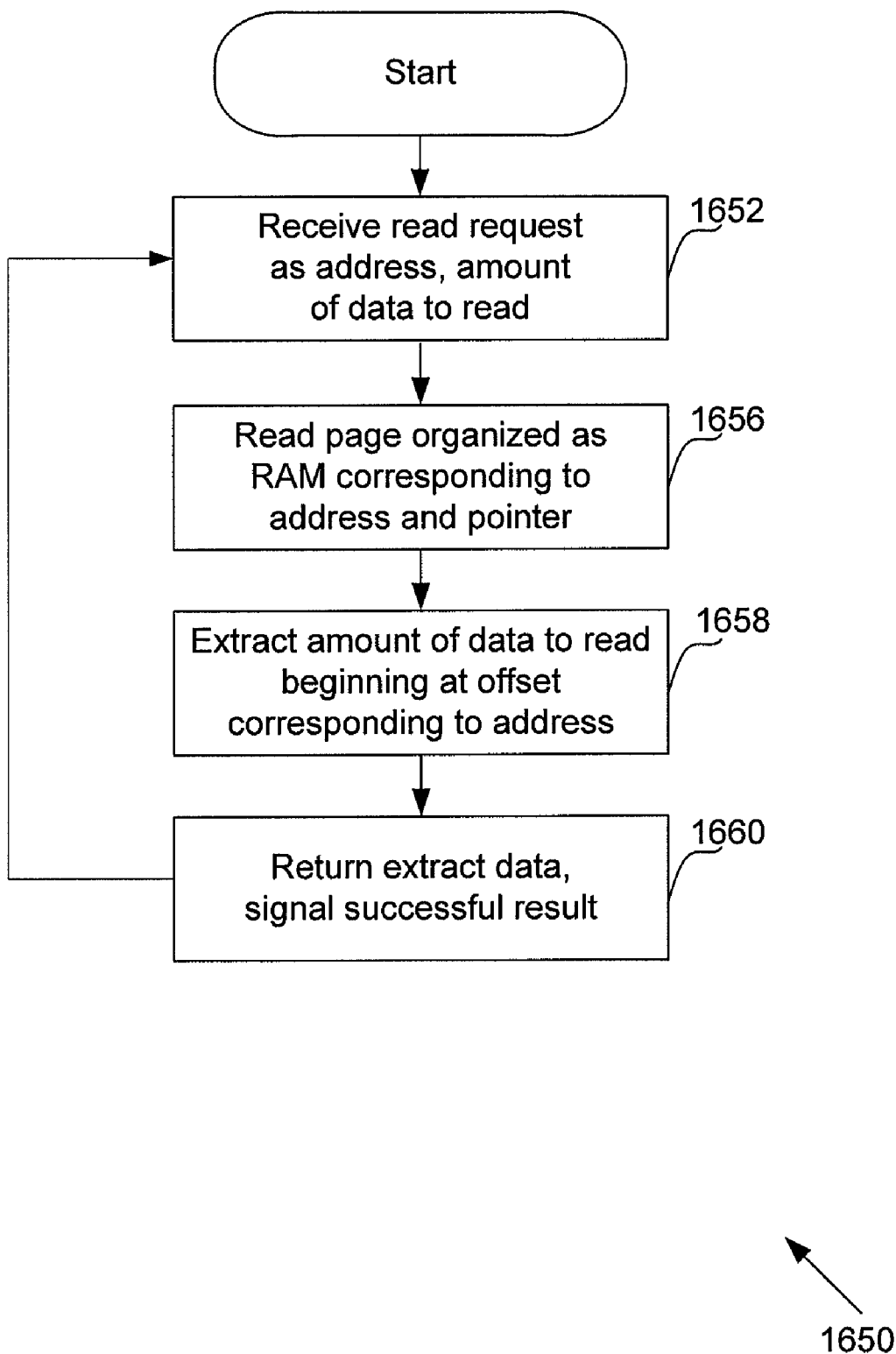
FIG. 16B is a flow diagram of exemplary steps for processing a read operation request from a page organized as RAM, in accordance with an embodiment.

FIG. 16B is a flow diagram of exemplary steps for processing a read operation request from a page organized as RAM, in accordance with an embodiment. At step 1652, the algorithm receives a read operation request to a page organized as RAM, including address and number of bytes to be read. Control passes to step 1656, where a page organized as RAM corresponding to the specified address is read from the memory. An address pointer may supplement the address information specified in the read request. At step 1658, a specified number of bytes of the read page contents at a location corresponding to the specified address are extracted from the read page. At step 1660, the plurality of extracted read page bytes are returned, and successful completion of the read operation may be signaled. Control passes to step 1652 to wait for another read operation request.

Referring back to FIG. 10, algorithm step 1006 may receive storage requests for data space in a page organized as RAM from a plurality of memory clients. Referring back to FIG. 1C, in one embodiment, a host 180 may request storage space in a page organized as RAM. In another embodiment, a microprocessor 112 may request storage space in a page organized as RAM. In another embodiment, a host 180 and a microprocessor 112 may both make separate requests for storage space in a page organized as RAM. Each request from a host 180 or a microprocessor 112 may originate from a separate process or program executed in the host or microprocessor, respectively.

Referring to FIG. 16A, algorithm step 1602 may receive write operation requests in a page organized as RAM from a plurality of memory clients. Referring back to FIG. 1C, in one embodiment, a host 180 may request a write operation to a page organized as RAM. In another embodiment, a microprocessor 112 may request a write operation to a page organized as RAM. In another embodiment, a host 180 and a microprocessor 112 may both make separate write operation requests to a page organized as RAM. Each request from a host 180 or a microprocessor 112 may originate from a separate process or program executed in the host or microprocessor, Referring to FIG. 16B, algorithm step 1652 may receive read operation requests in a page organized as RAM from a plurality of memory clients. Referring back to FIG. 1C, in one embodiment, a host 180 may request a read operation from a page organized as RAM. In another embodiment, a microprocessor 112 may request a read operation from a page organized as RAM. In another embodiment, a host 180 and a microprocessor 112 may both make separate read operation requests from a page organized as RAM. Each request from a host 180 or a microprocessor 112 may originate from a separate process or program executed in the host or microprocessor.

Algorithms 1600 and 1650 in FIGS. 16A and 16B may co-exist with other methods of accessing the remaining non-volatile memory not organized as RAM. For example, referring to FIG. 1A, a host 180 may access a portion of non-volatile memory 100 organized as RAM by issuing read and write commands to a specific range of logical addresses. The non-volatile memory 100 may recognize a logical address supplied by the host 180, and initiate the steps provided in algorithms 1600 and 1650 in FIGS. 16A and 16B, depending on whether a read or write access to a page organized as RAM is requested. Conversely, if the host 180 issues a read or write command outside of the specific range of logical addresses, the remaining portions of storage in the non-volatile memory may be accessed by other means. Moreover, a plurality of separate RAM structures may be simultaneously implemented by allocating separate logical address ranges for each page organized as RAM to be implemented.

A page organized as RAM may be accessed by the host at a specialized logical address range, and the controller microprocessor may consult a data pointer to quickly determine the location of the page, which may reduce the number of accesses to the non-volatile memory required to retrieve system and control information in order to complete a read operation, thus possibly improving access time. A page organized as RAM may be allocated to a plurality of processes, where each process may store less than a page or less than a sector of data. Because the plurality of processes share the page organized as RAM, data may be stored more efficiently. If a block is dedicated to storing the current version of the page organized as RAM, the time associated with garbage collection of that block will be minimized, thereby improving the worst-case write time. If the block is shared with other processes that inefficiently store data, the garbage collection may still take far less than the time required to copy a full block. Using a threshold number of empty pages to trigger garbage collection on the block used to store the page organized as RAM may also improve worst-case write time, by allowing garbage collection to be completed between write operations. Worst-case write and read times may be further reduced by suspending other processes, such as read scrub and wear leveling, during a read or write access to a page organized as RAM. All of these features, individually, or taken together, may improve the performance feasibility of using non-volatile memory to emulate Random Access Memory. By utilizing non-volatile memory as Random Access Memory, the required volatile RAM in a controller may be reduced.

The invention may be adapted to Secure Digital removable memory cards. For example, the Secure Digital interface may require a maximum host read latency of 100 milliseconds. Referring back to FIG. 1C, a host 180 read command may require the microprocessor 112 in the non-volatile memory 100 to perform additional read or write accesses to the memories 130, 140. In one example, the microprocessor 112 performs additional accesses to the memories 130, 140 for encryption, decryption, or other digital rights management (DRM) operations required to complete the host read command request. In some non-volatile memories, these additional microprocessor 112 accesses may trigger a block copy operation, and the block copy operation may cause the host read operation to exceed the maximum required read latency. An embodiment of the invention may reduce the time to write and read records in the non-volatile memory in order to meet the maximum host read latency requirements. Similarly, the invention may allow microprocessor 112 to perform additional accesses to the memories 130, 140, during host write or read operations, while allowing non-volatile memory 100 to comply with other worst-case timing requirements of the Secure Digital interface.

Although the invention has been described with respect to various exemplary embodiments, it will be understood that the invention is entitled to protection within the full scope of the appended claims.

The invention claimed is:

1. A method of writing data to a non-volatile memory having memory cells arranged in minimum units of erase of a block, a page being a unit of programming of a block, comprising:
   receiving a request for storage of data at the non-volatile memory, the non-volatile memory comprising a plurality of blocks, where at least one page of one of the plurality of blocks is organized as random access memory (RAM);
   determining if an address associated with the request relates to the at least one page organized as RAM;
   if the address relates to the at least one page organized as RAM:
      retrieving a pointer identifying the location of the page;
      reading stored data for the page from said non-volatile memory into a page buffer, said page of stored data comprising an allocated data space addressable in an increment of address less than a sector, said allocated data space comprising obsolete data;
      updating a portion of stored data in said page buffer with said data to form an updated page of data;
      allocating unprogrammed storage space addressable in a first increment of address in said non-volatile memory sufficient to store said updated page of data;
      writing said updated page of data to said allocated storage space; and
      updating said pointer with a location of said allocated storage space.

2. The method of claim 1, wherein said page of stored data and said allocated storage space are within a same block of said non-volatile memory.

3. The method of claim 1, wherein said page of stored data is stored in a first block, further comprising:
   allocating a second block when a number of erased pages in said first block equals a threshold;
   copying all valid sectors in all valid pages from said first block to said second block; and
   erasing said first block.

4. The method of claim 3, wherein said threshold is zero.

5. The method of claim 3, wherein said valid pages comprise only said page of stored data.

6. The method of claim 3, wherein a number of said all valid sectors in said all valid pages is less than a number of sectors in said all valid pages.

7. The method of claim 1, further comprising disabling access to said non-volatile memory for a plurality of processes during said writing of data.

8. The method of claim 1, wherein said first increment of address is a multiple of sectors greater than or equal to one, wherein a sector comprises 512 bytes.

9. The method of claim 1, wherein the allocated data space is addressable in single byte increments of is a byte.

10. The method of claim 1, wherein said address pointer is stored in said non-volatile memory.

11. The method of claim 1, wherein said updating is performed by a host in communication with said non-volatile memory.

12. The method of claim 1, wherein said updating is performed by a process within a memory card comprising said non-volatile memory.

13. The method of claim 1, wherein said block comprises more than one block, and wherein said page comprises more than one page.

14. A method of providing a write interface for storing data in a non-volatile memory having memory cells arranged in minimum units of erase of a block, a page being a unit of programming of a block, where at least one of a plurality of blocks in the non-volatile memory includes at least one page organized as random access memory (RAM), the method comprising:
   receiving an address and data to be written, wherein the address identifies a plurality of stored bytes less than a sector;
   determining if the received address relates to the at least one page organized as RAM;
   if the address relates to the at least one page organized as RAM:
      disabling processes in the non-volatile memory capable of accessing the non-volatile memory during a write operation to the at least one page organized as RAM;
      locating a programmed page associated with said address, wherein said programmed page is addressable in a first increment of address greater than or equal to a sector;
      copying said programmed page into a page buffer;
      updating a portion of data in said page buffer with said data to be written;
      allocating an unprogrammed page addressable in said first increment of address;
      programming said unprogrammed page using said page buffer to form a programmed page;
      associating said received address with said programmed page; and
      after associating said received address, enabling the disabled processes capable of accessing the non-volatile memory during a write operation to the at least one page organized as RAM.

15. The method of claim 14, wherein said page of data and said allocated storage space are within a same block of said non-volatile memory.

16. The method of claim 14, wherein said programmed page is stored in a first block, further comprising:
- allocating a second block when a number of unprogrammed pages in said first block equals a threshold;
- copying all valid sectors in all valid pages from said first block to said second block; and
- erasing said first block.

17. The method of claim 16, wherein said threshold is zero.

18. The method of claim 16, wherein said valid pages comprise only said programmed page.

19. The method of claim 16, wherein a number of said all valid sectors in said all valid pages is less than a number of sectors in said all valid pages.

20. The method of claim 14, wherein said first increment of address is a multiple of sectors greater than or equal to one, wherein a sector comprises 512 bytes.

21. The method of claim 14, wherein said block comprises more than one block, and wherein said page comprises more than one page.

22. A memory card comprising:
- a non-volatile memory comprising memory cells, the memory cells arranged in minimum units of erase of a block, a page being a unit of programming of a block, the non-volatile memory comprising a plurality of blocks, where at least one page of one of the plurality of blocks is organized as random access memory (RAM); and
- a controller in communication with the non-volatile memory, the controller configured to:
  - receive a request for storage of data at the non-volatile memory,
  - determine if an address associated with the request relates to the at least one page organized as RAM;
  - if the address relates to the at least one page organized as RAM:
    - retrieve a pointer identifying the location of the page;
    - read stored data for the page from said non-volatile memory into a page buffer, said page of stored data comprising an allocated data space addressable in an increment of address, said allocated data space comprising obsolete data;
    - update a portion of stored data in said page buffer with said data to form an updated page of data;
    - allocate storage space addressable in a first increment of address in said non-volatile memory sufficient to store said updated page of data;
    - write said updated page of data to said allocated storage space; and
    - update said pointer with a location of said allocated storage space.

* * * * *

UNITED STATES PATENT AND TRADEMARK OFFICE
CERTIFICATE OF CORRECTION

| | | |
|---|---|---|
| PATENT NO. | : 8,296,498 B2 | Page 1 of 1 |
| APPLICATION NO. | : 11/939318 | |
| DATED | : October 23, 2012 | |
| INVENTOR(S) | : Gorobets et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1061 days.

Signed and Sealed this
Twenty-ninth Day of December, 2015

Michelle K. Lee
*Director of the United States Patent and Trademark Office*